(12) United States Patent
Reid

(10) Patent No.: US 11,598,869 B2
(45) Date of Patent: Mar. 7, 2023

(54) SYSTEMS AND METHODS FOR ACOUSTIC AND/OR ELECTROMAGNETIC IMAGING

(71) Applicant: SEZANNE MARINE LIMITED, Argyll (GB)

(72) Inventor: Ceri Reid, Central Scotland (GB)

(73) Assignee: SEZANNE MARINE LIMITED, Argyll (GB)

(*) Notice: Subject to any disclaimer, the term of this patent is extended or adjusted under 35 U.S.C. 154(b) by 929 days.

(21) Appl. No.: 16/258,234

(22) Filed: Jan. 25, 2019

(65) Prior Publication Data
US 2019/0170873 A1 Jun. 6, 2019

Related U.S. Application Data

(63) Continuation-in-part of application No. PCT/EP2018/070362, filed on Jul. 26, 2018.

(30) Foreign Application Priority Data

Jul. 26, 2017 (GB) .................................. 1712024

(51) Int. Cl.
G01S 7/00 (2006.01)
G01S 15/10 (2006.01)
(Continued)

(52) U.S. Cl.
CPC .............. G01S 15/102 (2013.01); G01S 7/28 (2013.01); G01S 7/282 (2013.01); G01S 7/292 (2013.01);
(Continued)

(58) Field of Classification Search
USPC .......................................... 367/99; 356/3.01
See application file for complete search history.

(56) References Cited

U.S. PATENT DOCUMENTS 4,678,345 A 7/1987 Agoston
5,652,594 A 7/1997 Costas
(Continued)

FOREIGN PATENT DOCUMENTS

EP 1903682 A1 3/2008
JP 2010-142450 A 7/2010
(Continued)

OTHER PUBLICATIONS

P.M. Grant, "Multirate Signal Processing", Electronics & Communication Engineering Journal, 8, No. 1, Feb. 1996, 10 pages.
(Continued)

Primary Examiner — James R Hulka
(74) Attorney, Agent, or Firm — Marshall, Gerstein & Borun LLP

(57) ABSTRACT

A method for use in acoustic imaging, comprising: transmitting, from a transmitter, a first sound wave pulse at a first frequency determined by a maximum sampling rate of a receiver; transmitting at least one second sound wave pulse at a frequency substantially equal to the first frequency, the first and at least one second sound wave pulses being transmitted substantially within a fraction of a sample interval of the receiver; receiving and sampling, at the receiver, a reflection of at least two of the first and at least one second pulses to generate a set of receiver samples; and expanding the set of receiver samples, based on the first frequency and a total number of the first and at least one second pulses transmitted, to generate an expanded sample set with a larger number of samples than the set of receiver samples.

17 Claims, 6 Drawing Sheets

(51) Int. Cl.
  *G01S 13/00*  (2006.01)
  *G01S 13/10*  (2006.01)
  *G01S 13/89*  (2006.01)
  *G01S 15/00*  (2020.01)
  *G01S 7/28*  (2006.01)
  *G01S 7/533*  (2006.01)
  *G01S 7/52*  (2006.01)
  *G01S 15/89*  (2006.01)
  *G01S 7/523*  (2006.01)
  *G01S 7/282*  (2006.01)
  *G01S 7/292*  (2006.01)
  *G01S 7/526*  (2006.01)
  *G01S 13/34*  (2006.01)

(52) U.S. Cl.
  CPC ............ *G01S 7/5202* (2013.01); *G01S 7/523* (2013.01); *G01S 7/526* (2013.01); *G01S 7/52025* (2013.01); *G01S 7/52034* (2013.01); *G01S 7/533* (2013.01); *G01S 13/006* (2013.01); *G01S 13/10* (2013.01); *G01S 13/106* (2013.01); *G01S 13/34* (2013.01); *G01S 13/89* (2013.01); *G01S 15/006* (2013.01); *G01S 15/10* (2013.01); *G01S 15/89* (2013.01); *G01S 15/8952* (2013.01); *G01S 15/8979* (2013.01)

(56) References Cited

U.S. PATENT DOCUMENTS

| | | | |
|---|---|---|---|
| 8,232,907 B2 | 7/2012 | Aarseth et al. | |
| 8,861,588 B2* | 10/2014 | Nguyen | G01S 13/9017 375/240 |
| 9,057,782 B2* | 6/2015 | Feigin | G01S 7/2923 |
| 2005/0031016 A1* | 2/2005 | Rosen | H04B 1/69 375/130 |
| 2005/0031051 A1* | 2/2005 | Rosen | H04B 1/713 375/147 |
| 2005/0041752 A1* | 2/2005 | Rosen | H04L 27/001 375/259 |
| 2005/0041756 A1* | 2/2005 | Rosen | H04L 27/001 375/295 |
| 2005/0041757 A1* | 2/2005 | Rosen | H04L 27/001 375/295 |
| 2005/0100077 A1* | 5/2005 | Rosen | H04L 27/001 375/130 |
| 2005/0225476 A1 | 10/2005 | Hoetzel et al. | |
| 2008/0291080 A1 | 11/2008 | Wilens et al. | |
| 2010/0298707 A1 | 11/2010 | Fan et al. | |
| 2011/0125017 A1 | 5/2011 | Ramamurthy et al. | |
| 2012/0250748 A1* | 10/2012 | Nguyen | G01S 13/9017 375/316 |
| 2014/0049418 A1* | 2/2014 | Feigin | G01S 13/885 342/22 |
| 2015/0285905 A1 | 10/2015 | Eldar et al. | |
| 2017/0031004 A1 | 2/2017 | Jales et al. | |

FOREIGN PATENT DOCUMENTS

| | | |
|---|---|---|
| WO | WO-2013/067594 A1 | 5/2013 |
| WO | WO-2013/087402 A1 | 6/2013 |
| WO | WO-2014/080303 A1 | 5/2014 |

OTHER PUBLICATIONS

Xi et al., "Quadrature Compressive Sampling for Radar Signals", IEEE Transactions on Signal Processing, vol. 62, No. 11, Jun. 1, 2014, pp. 2787-2802.
Search Report in GB Application No. 1712024.7 dated Nov. 30, 2017, 4 pages.
Search Report in GB Application No. 1712024.7 dated Apr. 10, 2018, 2 pages.
Search Report and Written Opinion in International Application No. PCT/EP2018/070362 dated Nov. 8, 2018, 17 pages.
Examination Report in EP Application No. 18745946.6 dated Mar. 18, 2022, 4 pages.
Examination Report in UK Application No. GB1712024.7 dated Jul. 7, 2022, 5 pages.
Examination Report in UK Application No. GB2209806.5 dated Jul. 29, 2022, 6 pages.

* cited by examiner blue    red blue    red red
blue blue
red blue    red

Figure 2b    red    blue grey    blue

SYSTEMS AND METHODS FOR ACOUSTIC AND/OR ELECTROMAGNETIC IMAGING

CROSS-REFERENCE TO RELATED APPLICATION

This is a continuation-in-part of International Application No. PCT/EP2018/070362, filed Jul. 26, 2018, which claims the benefit of priority to U.K. Application No. 1712024.7, filed Jul. 26, 2017, the entire respective disclosures of which are incorporated herein by reference.

DESCRIPTION OF INVENTION

The present invention relates to methods and systems for use in acoustic and/or electromagnetic imaging.

Various mechanisms use the propagation of a signal through a medium—sonar, ultrasound, radar—with the objective of allowing the echoes of a target to be detected in the received data.

In a sonar or ultrasound (or radar) system having a sound (or radio) wave transmitter and a sound (or radio) wave receiver, the purpose of a signal (of sound waves, or radio waves) is to obtain high resolution data from the area being subjected to its transmissions.

An image is considered a better image for having a high resolution, containing more information. However, in order to obtain high resolution images, sizeable and/or expensive equipment is often required.

Embodiments of the present invention relate to sonar and medical ultrasound systems, but in general can be applied to electromagnetic radiation systems, as well as those acoustic ones.

Generally, there are two forms of resolution—range resolution and angular resolution.

Range resolution is the system's ability to discriminate between two objects at the same angle relative to a sensor, but which are at different ranges (i.e. positions along an axis at that angle from the sensor); and angular resolution is the system's ability to discriminate between objects which are at the same range but are some distance apart (that distance being defined in terms of the angle between the axes, extending from the sensor, on which the objects lie).

The higher the resolution obtained, the more useful the system is.

The resolution—range resolution and angular resolution—of a system depends on the bandwidth and the frequency of the system. For example, range resolution is generally taken to be:

RangeResolutionInMetres=$c/(2B)$, where c is the velocity through the medium, and B is the signal's bandwidth (i.e. the range of frequencies present in the signal, in Hz). A greater bandwidth results in a smaller (therefore, better) range resolution.

A transducer produces sound waves from electricity in a sonar system, for example. For a linear transducer or linear transducer array:

AngularResolutionInDegrees=50.8/ArrayLengthInLambda so, an array length that is 101.6λ will produce an angular resolution of 0.5°—with reference to 'An Introduction to Underwater Acoustics: Principles and Applications (Springer Praxis Books)' by Xavier Lurton, page 184.

The array length above is an electrical length, in units of multiples of a given wavelength, λ.

Because v=fλ (where v is velocity through the medium, f, the angular resolution, and λ is wavelength), this means that for a given physical size, L in metres, of transducer, AngularResolutionInDegrees=50.8 $v/(Lf)$ meaning that higher angular resolution (i.e. a smaller number of degrees) is proportional to the inverse of the frequency of the signal—i.e. higher frequencies (or larger transducers) give better resolution.

It is known that the resolutions of a system are a trade-off between utility and cost. Lower frequencies (below 20 kHz, for example) provide a longer range—this is due to lower rates of attenuation in a given distance. Higher frequencies (above 100 kHz, for example) provide better resolution. Further, higher frequencies allow for a smaller-sized system (compared with a larger array of receivers which may be required for a frequency below 1 kHz, for example). However, propagation losses increase with frequency.

As above, range resolution depends on the bandwidth obtained; so, higher A/D (analogue-to-digital) sample rates, using an A/D converter in conjunction with or as part of a receiver (i.e. a sensor), can improve range resolution by increasing captured bandwidth. But increased sample rate increases component and ancillary electronics costs, so a compromised—and therefore potentially detrimental—range resolution may result, to keep costs reasonable.

Similarly, obtaining higher angular resolution for a given size of transmitter and receiver means a system works at a higher frequency, often at a higher cost, or with other disadvantages (e.g. shorter range). So, both range and angular resolution can be improved by increasing system bandwidth or operating frequency.

It should be emphasised that the frequency used for acoustics or electromagnetics is not often known to have any intrinsic property that makes it 'better' than any other frequency—the frequency used for a function is nearly always a trade-off between achievable system range, system resolution, system size and system cost.

In an active sonar system, for example, a sonar transmitter generates an electrical signal of a given frequency, applied to a sonar transducer or a sonar projector or the like to create pulses of sound waves having that frequency in water (for transmitting into the ocean, or a lake, etc.). Usually, a transmitted pulse's characteristics—its frequency and bandwidth—are a result of the known capabilities of a receiver, for example a hydrophone (or hydrophone array) used to collect sound waves.

If a receiver is limited to 100 ksamples/s sampling in analogue to digital conversion (A/D), for example, then it follows to have a 50 kHz bandwidth in the transmitted pulse.

This is because a sample rate of double the bandwidth is required to capture the bandwidth in digital form, as defined by Harry Nyquist. The Nyquist sampling frequency is the lowest sampling rate at which a signal can be sampled without the introduction of errors—this is calculated as twice the highest frequency present in the signal.

In this example, the system operates at 50 kHz. If the transmitted pulse has a bandwidth of 100 kHz (e.g. from a transmitted frequency of 100 kHz), information is being lost during reception, and the resulting range resolution is reduced (among other problems).

One means for preventing this loss of information may be to transmit a pulse twice, but with half-a-sample-interval offset in the transmission start times.

So, if the sample rate is, for example, 100 ksamples/s (10 µs sample interval), and the pulse length is 0.1 ms, a first pulse should be transmitted at t=0, and a second pulse should be transmitted at t=0.1 ms+(10/2) µs, or 0.105 ms.

In other words, a first pulse is transmitted at a first point in time. A second pulse, which is a repeat of the first pulse, is transmitted at a second point in time. The first pulse and the second pulse are transmitted at the same frequency. The time between the first pulse being transmitted and the second pulse being transmitted is a delay time, calculated based on the sample rate of the relevant system (for example, a sonar system receiving reflections of the pulses) and the number of repeated pulses (here, two).

These two pulses may be referred to as sub-pulses, and the two pulses may be transmitted as a set of sub-pulses. To obtain information about a pulse, instead of transmitting that pulse, information may be obtained by using a set of transmitted sub-pulses (where information derived from the sub-pulses may be pooled to determine information about the 'effective' pulse). Sub-pulses represent portions of an effective single pulse, with each sub-pulse containing a portion of the effective signal's frequency content, having the same duration as the effective pulse. Combining sub-pulses, in particular received reflections of sub-pulses, correctly gives all of the frequency content of the effective signal (i.e. the single pulse, which has been replaced with sub-pulses). References to a pulse herein may also refer to a sub-pulse, and vice-versa.

In this example, whatever target the second sub-pulse reflects from, it will be received with that 0.105 ms delay. This means that samples for the first detected reflection will occur at 10 µs intervals and samples from the second reflection will be at 10 µs intervals offset by 5 µs. Interleaving the first and second sample set in this example, samples are obtained every 5 µs, so the equivalent of 200 ksamples/s sampling.

If the reflections are the same, the 200 ksamples/s samples will give the same data as 200 ksamples/s sampling by a standard receiver. However, the example method of repeated pulses may be achievable at lower cost.

So, in the above example the bandwidth and range resolution have been doubled without the receiver costing any more (as would be likely if using a superior receiver) and in addition the higher operating frequency (100 kHz instead of 50 kHz) doubles the angular resolution ('doubles' in the context of angular resolution means 'makes it twice as good'—the number is actually halved).

In other words, repeating an identical pulse improves the range resolution and the angular resolution of the example system, due to fewer losses.

The present method must transmit the same pulse more than once, with a short, calculated and well-controlled delay. Further, the method must interleave the A/D samples to give the correct total sample rate (in the above example, 200 ksamples/s).

Undersampling is sampling at a given rate creating duplicates of portions of a signal in the frequency domain. Sampling at too-low a rate (i.e. below the Nyquist rate) can create duplicates of a portion of interest, but at lower frequencies than as occurred in the signal.

It is known to use undersampling to increase a number of samples by a factor of 'm', where m is the number of times the same pulse is transmitted (with transmission start time adjusted relative to the sampling instants). The factor, m, is also the ratio between the sampling rate being used and the sampling rate required for Nyquist sampling of the transmitted waveform.

Accordingly, an aspect of the present invention provides a method for use in acoustic imaging, comprising: transmitting, from a transmitter, a first sound wave pulse having a pulse length, at a first frequency determined by a maximum sampling rate of a receiver, which is an operating frequency of the system; transmitting at least one second sound wave pulse at a frequency substantially equal to the first frequency, the first and at least one second sound wave pulses being transmitted substantially within a time equal to the pulse length plus a fraction of a sample interval of the receiver; receiving and sampling, at the receiver, a reflection of at least two of: (i) the first and (ii) the at least one second sound wave pulses, to generate a set of receiver samples; and expanding the set of receiver samples, based on the first frequency and a total number of the first and at least one second sound wave pulses transmitted, to generate an expanded sample.

The method may further comprise: selecting a desired angular resolution for the system, determining a desired effective frequency of the expanded sample set based on that angular resolution, and performing pre-transmission band-pass sampling, wherein the first sound wave pulse is transmitted at a frequency 'fo', wherein fo is an operating frequency and is less than or equal to half the sampling rate 'fs', and wherein the set of samples from the first sound wave pulse is equivalent to a set of samples obtained from a sound wave pulse having an effective frequency equal to 'fo+kfs', wherein k is an integer.

The method may further comprise undersampling each sound wave pulse, wherein each sound wave pulse is transmitted at least twice.

Expanding the set of receiver samples may include interleaving the receiver samples.

Another aspect provides a method for use in acoustic imaging comprising: creating a waveform having a bandwidth; predicting samples obtainable by sampling the waveform at a sampling rate which is a multiple of the waveform bandwidth; defining, from the predicted samples, a first group of predicted samples and a second group of predicted samples; creating a first sound wave pulse for transmission based on the first group of predicted samples, having an operating frequency; creating a second sound wave pulse for transmission based on the second group of predicted samples; transmitting the first and second sound wave pulses, with an offset in transmission time based on the sample rate used to predict the samples; receiving and sampling respective reflections of the first and second sound wave pulses; and generating a received waveform sample set by interleaving the samples of the received first and second sound wave pulses.

Another aspect provides a method of performing demodulation of a sound wave, including performing an above method, wherein a first reflection provides an in-phase (I) sample and wherein a second reflection provides a quadrature or near-quadrature (Q) sample, wherein the second sound wave pulse is transmitted at a known phase angle from the first sound wave pulse.

The phase angle may be a phase angle of $\pi/2$ radians, with respect to an operating frequency of the system, and wherein the first sound wave pulse and second sound wave pulse are transmitted having a phase angle of $\pi/2$ radians, with respect to the operating frequency of the system.

Another aspect provides a method of performing demodulation of a sound wave, including performing an above method, wherein a first, and a second sound wave pulse is transmitted, and wherein each respective reflection provides one of in-phase (I) data and quadrature or near-quadrature (Q) data, wherein the phase angle between the first and the second sound wave pulses is 2π/3 radians, with respect to an operating frequency of the system.

At least one sound wave pulse may be a multiplexed signal.

The method may further comprise: obtaining phase information and magnitude information from at least one reflected sound wave pulse; using the sample interval, the phase information and the magnitude information to derive a frequency of the reflected sound wave pulse, and to derive a Doppler shift of the associated sample; and using the Doppler shift to derive the velocity of a target from which reflection occurred, relative to at least one of the transmitter and the receiver.

Another aspect provides a system for use in acoustic imaging, comprising: a transmitter configured to transmit a first sound wave pulse having a pulse length, at a first frequency determined by a maximum sampling rate of a receiver and configured to transmit at least one second sound wave pulse at a frequency substantially equal to the first frequency, the first and at least one second sound wave pulses being transmitted substantially within a time equal to the pulse length plus a fraction of a sample interval of the receiver; a receiver, configured to receive and sample a reflection of at least two of the first and at least one second sound wave pulses to generate a set of receiver samples; and a processor operable to expand the set of receiver samples, based on the first frequency and a total number of the first and at least one second sound wave pulses transmitted, to generate an expanded sample set.

Another aspect provides a system for use in acoustic imaging, comprising: a transmitter, configured to transmit a first sound wave pulse and a second sound wave pulse, the first and second sound wave pulses created for transmission based on predicted samples obtainable by sampling a waveform having a bandwidth, at a sampling rate which is a multiple of the waveform bandwidth and based on a first group of predicted samples and a second group of predicted samples defined from the predicted samples, the transmitter being further configured to transmit the first and second sound waves pulses with an offset in transmission time based on the sample rate used to predict the samples; a receiver configured to receive and sample respective reflections of the first and second sound wave pulses; and a processor configured to generate a received waveform sample set by interleaving the samples of the received first and second sound wave pulses.

Another aspect provides a method for use in acoustic imaging, comprising performing an above method or combination of methods.

Another aspect provides a system for use in acoustic imaging, comprising: a transmitter configured for use in an above method; and a receiver configured for use in an above method.

The transmitter and receiver may be arranged in an array, having an array spacing less than or equal to half the wavelength at the operating frequency.

The method may further include transmitting a duplicate of one of the first sound wave pulse or at least one second sound wave pulse.

The processor may be operable to expand the set of receiver samples including ordering the receiver samples to correlate with the transmitted sound wave pulses.

Another aspect provides a method for use in imaging, comprising: transmitting, from a transmitter, a first wave pulse having a pulse length, at a first frequency determined by a maximum sampling rate of a receiver, which is an operating frequency of the system; transmitting at least one second wave pulse at a frequency substantially equal to the first frequency, the first and at least one second wave pulses being transmitted substantially within a time equal to the pulse length plus a fraction of a sample interval of the receiver; receiving and sampling, at the receiver, a reflection of at least two of: (i) the first and (ii) the at least one second wave pulses, to generate a set of receiver samples; and expanding the set of receiver samples, based on the first frequency and a total number of the first and at least one second wave pulses transmitted, to generate an expanded sample set.

Another aspect provides a method further comprising: selecting a desired angular resolution for the system, determining a desired effective frequency of the expanded sample set based on that angular resolution, and performing pre-transmission bandpass sampling, wherein the first wave pulse is transmitted at a frequency 'fo', wherein fo is an operating frequency and is less than or equal to half the sampling rate 'fs', and wherein the set of samples from the first wave pulse is equivalent to a set of samples obtained from a wave pulse having an effective frequency equal to 'fo+kfs', wherein k is an integer.

The method may further comprise undersampling each wave pulse, wherein each wave pulse is transmitted at least twice.

Expanding the set of receiver samples may include interleaving the receiver samples.

Another aspect provides a method for use in imaging comprising: creating a waveform having a bandwidth; predicting samples obtainable by sampling the waveform at a sampling rate which is a multiple of the waveform bandwidth; defining, from the predicted samples, a first group of predicted samples and a second group of predicted samples; creating a first wave pulse for transmission based on the first group of predicted samples, having an operating frequency; creating a second wave pulse for transmission based on the second group of predicted samples; transmitting the first and second wave pulses, with an offset in transmission time based on the sample rate used to predict the samples; receiving and sampling respective reflections of the first and second wave pulses; and generating a received waveform sample set by interleaving the samples of the received first and second wave pulses.

Another aspect provides a method of performing demodulation of a wave, including performing an above method, wherein a first reflection provides an in-phase (I) sample and wherein a second reflection provides a quadrature or near-quadrature (Q) sample, wherein the second wave pulse is transmitted at a known phase angle from the first wave pulse.

The phase angle may be a phase angle of π/2 radians, with respect to an operating frequency of the system, and wherein the first wave pulse of the first pair and the first wave pulse of the second pair may be transmitted having a known phase angle between them, with respect to the operating frequency of the system.

Another aspect provides a method of performing demodulation of a wave including performing an above method, wherein a first and a second wave pulse is transmitted, and wherein each respective reflection provides one of in-phase (I) data and quadrature or near-quadrature (Q) data, wherein the phase angle between the first and the second wave pulses is 2π/3 radians, with respect to an operating frequency of the system.

Another aspect provides a method of performing demodulation of a wave, including performing an above method, wherein a first, a second and a third wave pulse is transmitted, and wherein each respective reflection provides one of in-phase (I) data and quadrature or near-quadrature (Q) data, wherein the phase angle between the first and the second wave pulses is 2π/3 radians, with respect to an operating frequency of the system, and wherein the phase angle between the second and the third wave pulses is 2π/3 radians, with respect to the operating frequency of the system.

At least one wave pulse may be a multiplexed signal.

The method may further comprise: obtaining phase information and magnitude information from at least one reflected wave pulse; using the sample interval, the phase information and the magnitude information to derive a frequency of the reflected wave pulse, and to derive a Doppler shift of the associated sample; and using the Doppler shift to derive the velocity of a target from which reflection occurred, relative to at least one of the transmitter and the receiver.

Another aspect provides a system for use in imaging, comprising: a transmitter configured to transmit a first wave pulse having a pulse length, at a first frequency determined by a maximum sampling rate of a receiver and configured to transmit at least one second wave pulse at a frequency substantially equal to the first frequency, the first and at least one second wave pulses being transmitted substantially within a time equal to the pulse length plus a fraction of a sample interval of the receiver; a receiver, configured to receive and sample a reflection of at least two of: (i) the first and (ii) the at least one second wave pulses to generate a set of receiver samples; and a processor operable to expand the set of receiver samples, based on the first frequency and a total number of the first and at least one second wave pulses transmitted, to generate an expanded sample set.

Another aspect provides a system for use in imaging, comprising: a transmitter, configured to transmit a first wave pulse and a second wave pulse, the first and second wave pulses created for transmission based on predicted samples obtainable by sampling a waveform having a bandwidth, at a sampling rate which is a multiple of the waveform bandwidth and based on a first group of predicted samples and a second group of predicted samples defined from the predicted samples, the transmitter being further configured to transmit the first and second waves pulses with an offset in transmission time based on the sample rate used to predict the samples; a receiver configured to receive and sample respective reflections of the first and second wave pulses; and a processor configured to generate a received waveform sample set by interleaving the samples of the received first and second wave pulses.

Another aspect provides a method for use in imaging, comprising performing an above method.

Another aspect provides a system for use in imaging, comprising: a transmitter configured for use in an above method; and a receiver configured for use in an above method.

The transmitter and receiver may be arranged in an array, having an array spacing less than or equal to half the wavelength at the operating frequency.

The method may further include transmitting a duplicate of one of the first wave pulse or at least one second wave pulse.

The processor may be operable to expand the set of receiver samples including ordering the receiver samples to correlate with the transmitted wave pulses.

An aspect of the present invention provides a method for use in imaging, comprising:

transmitting, from a transmitter, a first wave pulse having a pulse length, at a first frequency determined by a maximum sampling rate of a receiver, which is a system operating frequency; transmitting at least one second wave pulse at a frequency substantially equal to the first frequency, the first and at least one second wave pulses being transmitted substantially within a time equal to the pulse length plus a fraction of a sample interval of the receiver; receiving and sampling, at the receiver, a reflection of at least two of: (i) the first and (ii) the at least one second wave pulses, to generate a set of receiver samples; and expanding the set of receiver samples, based on the first frequency and a total number of the first and at least one second wave pulses transmitted, to generate an expanded sample set.

The method may further comprise selecting a desired system angular resolution, determining a desired effective frequency of the expanded sample set based on that angular resolution, and performing pre-transmission bandpass sampling, wherein the first wave pulse is transmitted at a frequency 'fo', wherein fo is an operating frequency and is less than or equal to half the sampling rate 'fs', and wherein the set of samples from the first wave pulse is equivalent to a set of samples obtained from a wave pulse having an effective frequency equal to 'fo+kfs', wherein k is an integer.

The method may further comprise undersampling each wave pulse, wherein each wave pulse is transmitted at least twice.

Expanding the set of receiver samples may include interleaving the receiver samples.

The method may be a method of performing demodulation of a wave, wherein a first and a second wave pulse is transmitted, and wherein each respective reflection provides one of in-phase (I) data and quadrature or near-quadrature (Q) data, wherein the phase angle between the first and the second wave pulses is 2π/3 radians, with respect to a system operating frequency.

The method may be a method of performing demodulation of a wave, wherein a first, a second and a third wave pulse is transmitted, and wherein each respective reflection provides one of in-phase (I) data and quadrature or near-quadrature (Q) data, wherein the phase angle between the first and the second wave pulses is 2π/3 radians, with respect to a system operating frequency, and wherein the phase angle between the second and the third wave pulses is 2π/3 radians, with respect to the system operating frequency.

At least one wave pulse may be a multiplexed signal.

The method may further comprise obtaining phase information and magnitude information from at least one reflected wave pulse; using the sample interval, the phase information and the magnitude information to derive a frequency of the reflected wave pulse, and to derive a Doppler shift of the associated sample; and using the Doppler shift to derive the velocity of a target from which reflection occurred, relative to at least one of the transmitter and the receiver.

The method may further comprise transmitting a duplicate of one of the first wave pulse or at least one second wave pulse.

The method may be a method of performing demodulation of a wave, wherein a first reflection provides an in-phase (I) sample and wherein a second reflection provides a quadrature or near-quadrature (Q) sample, wherein the second wave pulse is transmitted at a known phase angle from the first wave pulse.

The known phase angle may be a phase angle of π/2 radians, with respect to a system operating frequency.

The method may be a method of acoustic imaging, transmitting a first wave pulse comprises transmitting a first acoustic wave pulse, and transmitting a second wave pulse comprises transmitting a second acoustic wave pulse.

The method may further include generating an image using the expanded sample set.

Another aspect of the present invention provides a method for use in imaging comprising: creating a waveform having a waveform bandwidth; predicting samples obtainable by sampling the waveform at a sampling rate which is a multiple of the waveform bandwidth;

defining, from the predicted samples, a first group of predicted samples and a second group of predicted samples; creating a first wave pulse for transmission based on the first group of predicted samples, having an operating frequency; creating a second wave pulse for transmission based on the second group of predicted samples; transmitting the first and second wave pulses, with an offset in transmission time based on the sample rate used to predict the samples; receiving and sampling respective reflections of the first and second wave pulses; and generating a received waveform sample set by interleaving the samples of the received first and second wave pulses.

The method may be a method of performing demodulation of a wave, and wherein a first reflection provides an in-phase (I) sample and wherein a second reflection provides a quadrature or near-quadrature (Q) sample, wherein the second wave pulse is transmitted at a known phase angle from the first wave pulse.

The known phase angle may be a phase angle of $\pi/2$ radians, with respect to a system operating frequency.

The method may be a method of performing demodulation of a wave, wherein a first and a second wave pulse is transmitted, and wherein each respective reflection provides one of in-phase (I) data and quadrature or near-quadrature (Q) data, wherein the phase angle between the first and the second wave pulses is $2\pi/3$ radians, with respect to a system operating frequency.

The method may be a method of performing demodulation of a wave, wherein a first, a second and a third wave pulse is transmitted, and wherein each respective reflection provides one of in-phase (I) data and quadrature or near-quadrature (Q) data, wherein the phase angle between the first and the second wave pulses is $2\pi/3$ radians, with respect to a system operating frequency, and wherein the phase angle between the second and the third wave pulses is $2\pi/3$ radians, with respect to the system operating frequency.

At least one wave pulse may be a multiplexed signal.

The method may further comprise obtaining phase information and magnitude information from at least one reflected wave pulse; using the sample interval, the phase information and the magnitude information to derive a frequency of the reflected wave pulse, and to derive a Doppler shift of the associated sample; and using the Doppler shift to derive the velocity of a target from which reflection occurred, relative to at least one of the transmitter and the receiver.

The method may further include transmitting a duplicate of one of the first wave pulse or at least one second wave pulse.

The method may be a method of acoustic imaging, transmitting a first and second wave pulses comprises transmitting first and second acoustic wave pulses.

The method may further include generating an image using the received waveform sample set.

Another aspect of the present invention provides a system for use in imaging, comprising:

a transmitter configured to transmit a first wave pulse having a pulse length, at a first frequency determined by a maximum sampling rate of a receiver and configured to transmit at least one second wave pulse at a frequency substantially equal to the first frequency, the first and at least one second wave pulses being transmitted substantially within a time equal to the pulse length plus a fraction of a sample interval of the receiver;

a receiver, configured to receive and sample a reflection of at least two of: (i) the first and (ii) the at least one second wave pulses to generate a set of receiver samples; and a processor operable to expand the set of receiver samples, based on the first frequency and a total number of the first and at least one second wave pulses transmitted, to generate an expanded sample set.

The transmitter and receiver may be arranged in an array, having an array spacing less than or equal to half the wavelength at the operating frequency.

The processor may be operable to expand the set of receiver samples including ordering the receiver samples to correlate with the transmitted wave pulses.

The system may be for acoustic imaging and the transmitter may be configured to transmit acoustic wave pulses.

The processor may further be configured to generate an image from the expanded sample set.

Another aspect of the present invention provides a system for use in imaging, comprising:

a transmitter, configured to transmit a first wave pulse and a second wave pulse, the first and second wave pulses created for transmission based on predicted samples obtainable by sampling a waveform having a waveform bandwidth, at a sampling rate which is a multiple of the waveform bandwidth and based on a first group of predicted samples and a second group of predicted samples defined from the predicted samples, the transmitter being further configured to transmit the first and second waves pulses with an offset in transmission time based on the sample rate used to predict the samples; a receiver configured to receive and sample respective reflections of the first and second wave pulses; and a processor configured to generate a received waveform sample set by interleaving the samples of the received first and second wave pulses.

The transmitter and receiver may be arranged in an array, having an array spacing less than or equal to half the wavelength at the operating frequency.

The processor may be operable to expand the set of receiver samples including ordering the receiver samples to correlate with the transmitted wave pulses.

The system may be for acoustic imaging and the transmitter may be configured to transmit acoustic wave pulses.

The processor may further be configured to generate an image from the received waveform sample set.

Another aspect of the present invention provides a method for use in imaging, comprising:

transmitting, from a transmitter, a first wave pulse having a pulse length, at a first frequency , which is a system operating frequency; transmitting at least one second wave pulse at a second frequency, the first and at least one second wave pulses being transmitted at least one of: continuously, with a negligible delay time between pulses, and with a delay which is a fraction of a wavelength of the first or second wave pulse; receiving and sampling, at the receiver, a reflection of at least two of: (i) the first and (ii) the at least one second wave pulses, to generate a set of receiver samples; and expanding the set of receiver samples, based on the first and second frequencies and a total number of the first and at least one second wave pulses transmitted, to generate an expanded sample set.

The method may be a method of performing demodulation of a wave, wherein the first wave pulse and the at least one second wave pulse have a known phase difference allowing the phase difference between the at least two received reflections to be determined.

The method may be a method of performing demodulation of a wave, wherein a first reflection provides an in-phase (I) sample and wherein a second reflection provides a quadrature or near-quadrature (Q) sample, wherein sampling uses a calculation of a phase angle between two samples to identify the in-phase sample and quadrature or near-quadrature sample.

The method may further include generating an image using the expanded sample set.

The method may further include determining the relative distances traversed by the first wave pulse and the at least one second wave, determining the distance to a target, wherein the target is the medium from which the first and at least one second wave pulses are reflected.

The method may further comprise undersampling each wave pulse, wherein each wave pulse is transmitted at least twice.

Another aspect of the present invention provides a system for use in acoustic imaging, comprising: a transmitter configured to transmit a first wave pulse having a pulse length, at a first frequency and configured to transmit at least one second wave pulse at a second frequency, the first and at least one second wave pulses being transmitted at least one of: continuously, with a negligible delay time between pulses, and with a delay which is a fraction of a wavelength of the first or second wave pulse; a receiver, configured to receive and sample a reflection of at least two of the first and at least one second wave pulses to generate a set of receiver samples; and a processor operable to expand the set of receiver samples, based on the first and second frequencies and a total number of the first and at least one second wave pulses transmitted, to generate an expanded sample set.

The processor may be configured to perform demodulation of a wave, wherein the first wave pulse and the at least one second wave pulse have a known phase difference allowing the phase difference between the at least two received reflections to be determined.

The processor may be configured to perform demodulation of a wave, wherein a first reflection provides an in-phase (I) sample and wherein a second reflection provides a quadrature or near-quadrature (Q) sample, wherein processor is configured to calculate a phase angle between two samples to identify the in-phase sample and quadrature or near-quadrature sample.

The processor may further be configured to generate an image from the expanded sample set.

The processor may further be configured to determine the relative distances traversed by the first wave pulse and the at least one second wave pulse, determining the distance to a target, wherein the target is the medium from which the first and at least one second wave pulses are reflected.

BRIEF DESCRIPTION OF THE DRAWINGS

The patent or application file contains at least one drawing executed in color. Copies of this patent or patent application publication with color drawings will be provided by the Office upon request and payment of the necessary fee.

Embodiments are described, by way of example only, with reference to the accompanying figures.

DETAILED DESCRIPTION

Figure 3:
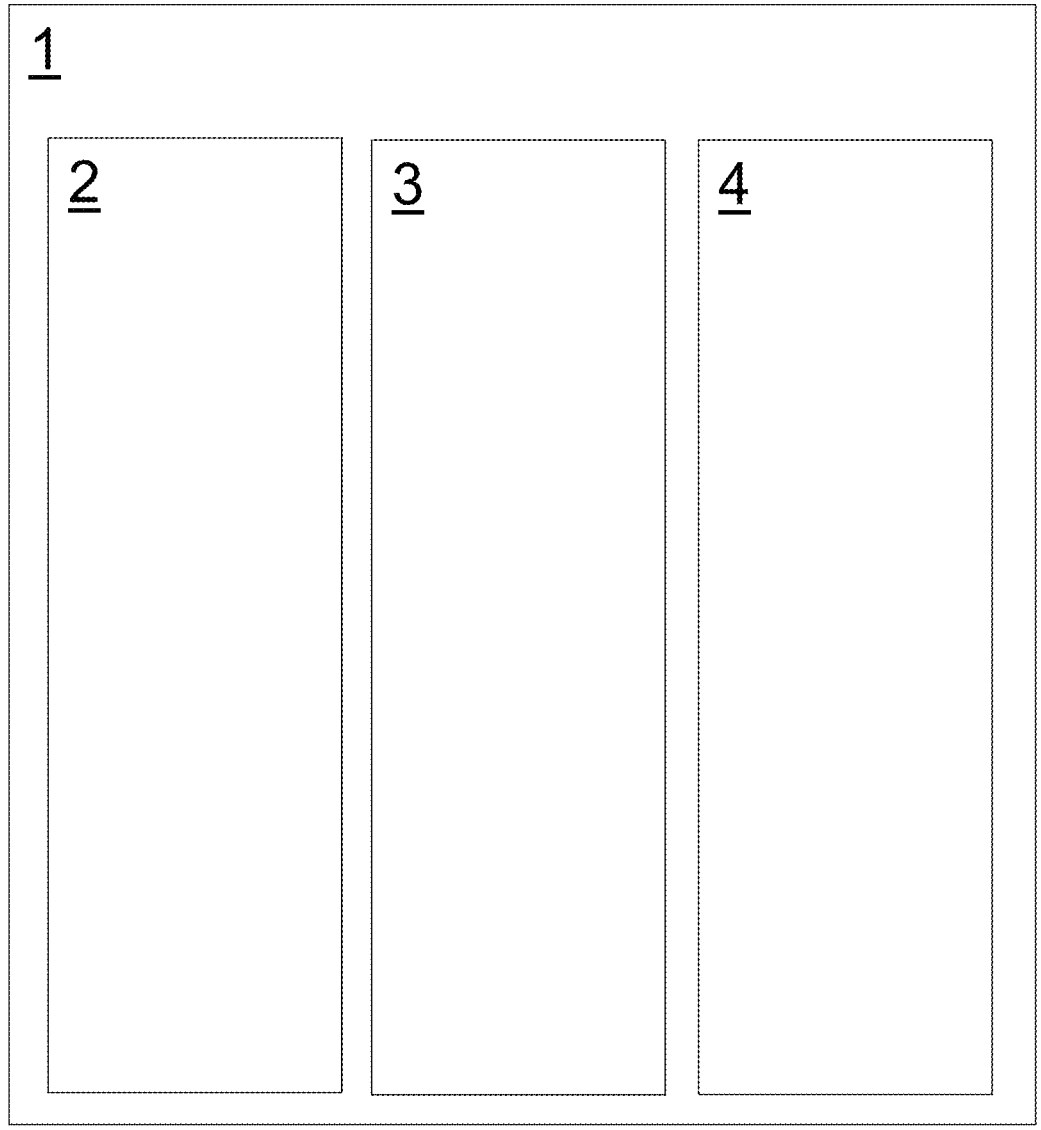
FIG. 3 shows a system of some embodiments.

In accordance with FIG. 3, a system 1 may include a transmitter 2, a receiver 3, and a processor 4 or other computational unit (which may be part of the transmitter 2 and/or receiver 3). The system 1 may be located with respect to a target 5. The operation of embodiments is described with reference to this system 1 and its functions.

Figure 1A:
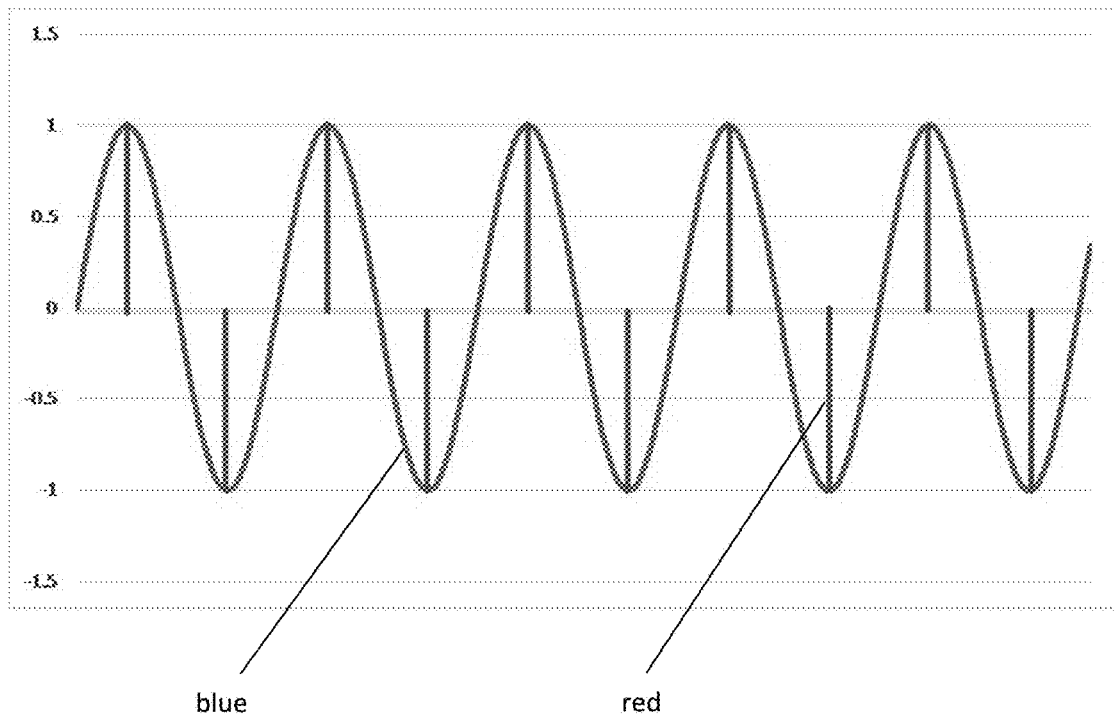
FIGS. 1a to 2f illustrate embodiment of the present process and show example waveforms representing the results obtained.

FIG. 1a shows a continuous waveform signal being received and sampled by an A/D device. It can be seen that the samples (the vertical lines) occur so that the Nyquist sampling principle is satisfied (i.e. every 180° or $\pi$ radians).

Figure 1B:
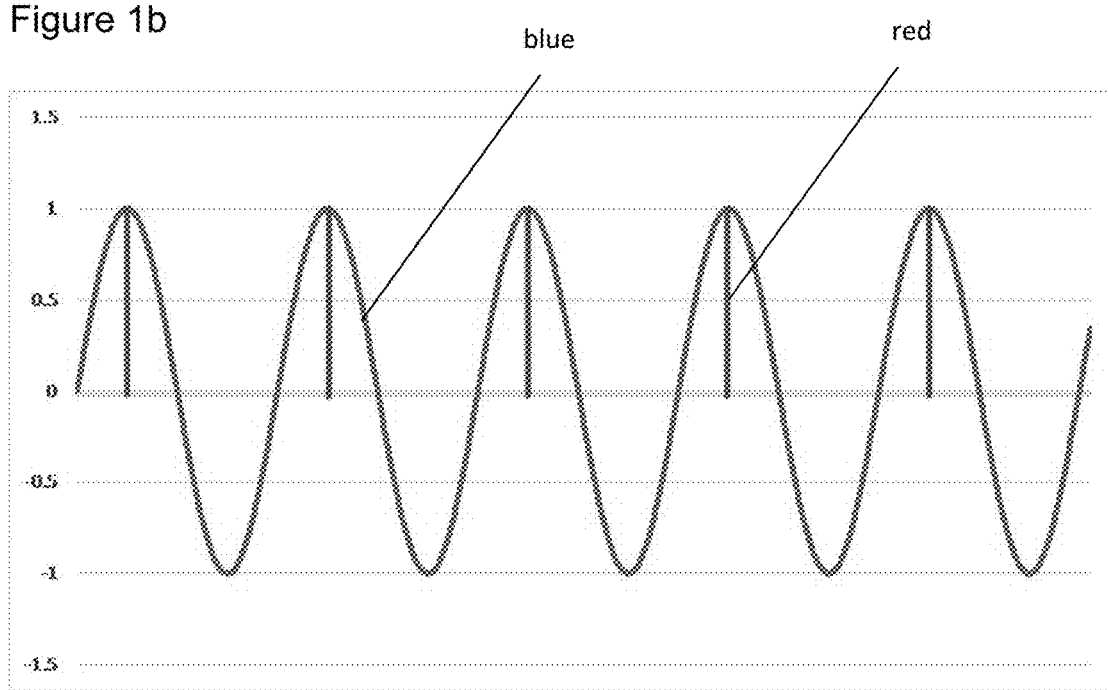

FIG. 1b shows the same waveform being sampled at half the Nyquist rate, so that samples occur at intervals of 360° or $2\pi$ radians.

Figure 1C:
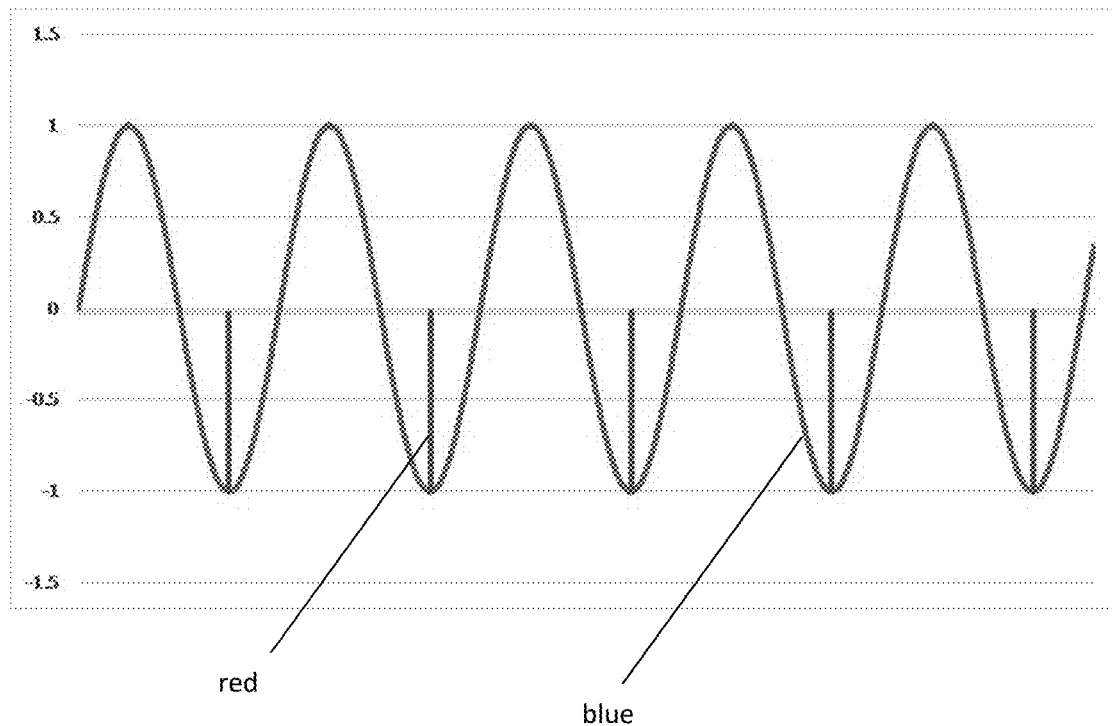

FIG. 1c shows the same waveform being sampled at half the Nyquist rate, with an offset of $\pi$ relative to the sampling in (b). It can be seen that the samples that occur in (c) are those in (a) that do not occur in (b).

Figure 1D:
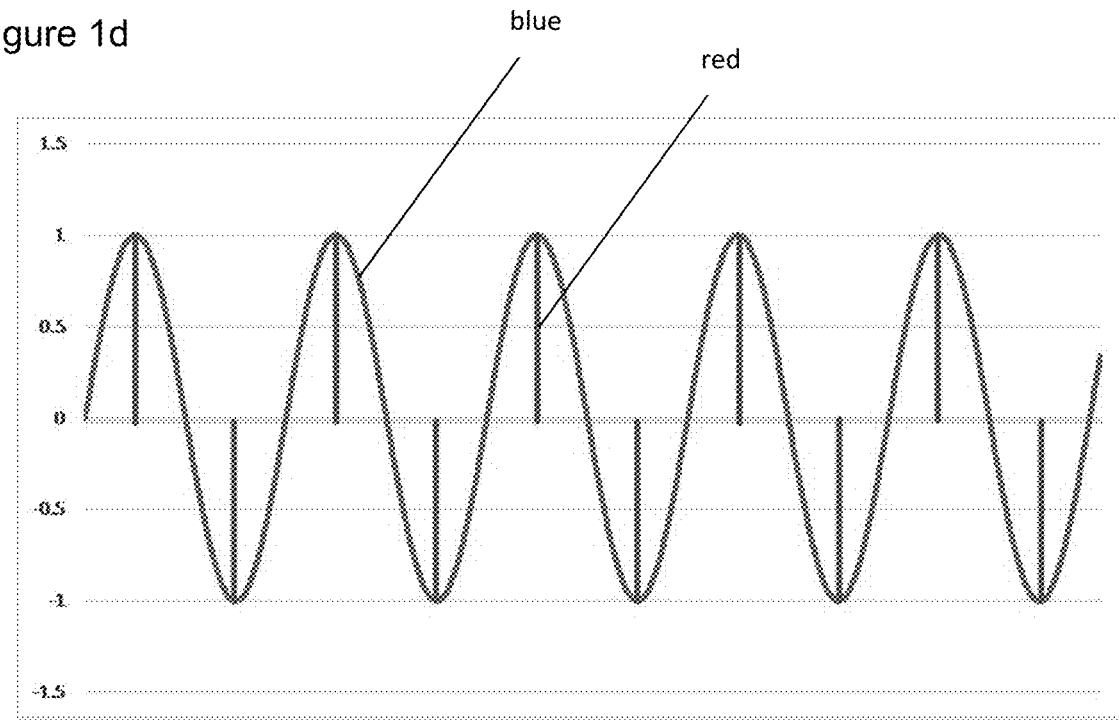

FIG. 1d shows the interleaved samples from (b) and (c), showing that the result of sampling two identical waveforms at half the Nyquist rate, but with an appropriate offset, gives exactly the same sample data as Nyquist sampling.

It is assumed, for simplicity of illustration, that the samples coincide with the sine wave maxima and minima—but even with random phase offset, the overall results obtained perform the same useful function. The present method works regardless of phase offset of the samples relative to the waveform being sampled.

The present method is herein known as 'Inverse Time Division Multiplexing' (ITDM).

Time Division Multiplexing is well-known, and usually refers to sending multiple low-bandwidth signals through a high-bandwidth channel by multiplexing them.

Embodiments of the present invention are based on reversing standard time division multiplexing, using a limited capacity (bandwidth) channel, using multiplexing to send a high-bandwidth signal through the channel.

In other words, embodiments of the present invention involve successive undersampling of a received waveform.

Embodiments of the present invention implement multiplexing in relation to transmission, in that multiple transmitted pulses are representative of a single effective transmitted pulse.

Embodiments of the present invention are not strictly the 'inverse' of conventional time division multiplexing. The general form of ITDM described above will herein be referred to as ITDM-1, providing an aspect of embodiments of the present invention.

In the previous example, given that the waveform has bandwidth of 100 kHz, 200 ksamples/s sampling is required. The two episodes of 100 ksamples/s sampling are each at less than the Nyquist sampling frequency required to properly characterise the pulse.

The exemplary 100 ksamples/s sampling can only capture all of the characteristics of a 50 kHz pulse—therefore, this is undersampling of the 100 kHz pulse, twice, and the data obtained has been interleaved to give Nyquist sampling.

In ITDM-1 described above, to obtain high angular resolution, a high frequency must be transmitted. Another version of ITDM will be explored now—for the purpose of reducing the reliance on high frequency for high angular resolution.

The following will be referred to as ITDM-2. The example values used above will be used here, for ease of comparison of ITDM-1 and -2.

If 50 kHz is the bandwidth that can be captured, then it is particularly effective to limit the bandwidth being transmitted in each of the pair of 'pings' (i.e. transmitted pulses, and in particular sub-pulses) to 50 kHz. But if the correct 50 kHz waveforms are used, those waveforms will combine to give 100 kHz bandwidth.

One way of achieving this is to create a 100 kHz waveform and work out the samples that would be obtained from that waveform if 200 ksamples/s sampling were used to capture its 100 kHz bandwidth, for example, then, taking all the even samples and creating a sub-pulse based on those even samples, and taking all the odd samples and creating a sub-pulse based on those odd samples. Digitising the two sub-pulses at 100 ksamples/s, with a half-sample offset between the timing of the two sub-pulses, results in the same samples as would be derived from 200 ksamples/s sampling of the original 100 kHz pulse (where these values are simply exemplary values, for illustrative purposes).

In practice, the 200 ksamples/s sampling could be carried out in the same way as that discussed in ITDM-1, above—i.e., transmitting each of the 50 kHz bandwidth sub-pulses at half-sample-interval offsets, then receiving reflections of the sub-pulses from a target 5, and interleaving the data to obtain the 200 ksamples/s sampling and 100 kHz bandwidth.

In other words, an aspect of the present invention includes creating a waveform and predicting samples which are obtainable using sampling at a sampling rate of twice the waveform bandwidth, defining even samples and odd samples, creating a pulse (i.e. sub-pulse) for transmission based on the even samples, creating a pulse (i.e. sub-pulse) for transmission based on the odd samples, transmitting each pulse, with a half-sample offset (based on there being two pulses) and receiving respective reflections at a sampling rate equal to the bandwidth of the pulses, digitising the even pulse and digitising the odd pulse samples such that the resulting samples may be interleaved to create a sample of an effective single pulse at twice bandwidth sampling rate.

This is a method of reducing both the transmitted bandwidth and the rate of sampling on reception, to obtain the characteristics of a signal with a higher transmitted frequency and a higher sampling rate on reception—that is, better angular resolution (because for a given receiver element size, a higher frequency gives higher angular resolution), and better range resolution (because the higher sampling rate allows for sampling across a greater bandwidth).

By way of example, let 'n' be the number of sub-pulses transmitted and sampled; n is also the ratio between the effective frequency (the frequency used to determine angular resolution and range resolution) and the operating frequency (the actual frequency used to transmit the sub-pulses).

Above, the present method has involved doubling frequency by transmitting two sub-pulses, at half-sample-interval offsets. But there is no obvious limit to this method—the effective frequency can be multiplied by 10 if ten sub-pulses are used, each with 1/10 of the required bandwidth, and each at an offset of 1/10 of the sample interval, for example. The operating frequency—i.e. the frequency at which the sub-pulses are transmitted—is 1/10 of the effective frequency.

FIGS. 2a-f illustrate ITDM-2. As in ITDM-1, as shown in FIGS. 1a-d, the samples that result are all peak maxima or peak minima—assuming the samples are timed appropriately. If the samples started at a random phase offset, the samples obtained would be of the same value for each sub-pulse, and one sub-pulse would have only positive samples, the other only negative samples; but the pairs of samples obtained would always be equal to sines of a difference of $\pi$ or 180° or $\lambda/2$, as is the case in FIGS. 2a-f.

Figure 2A:
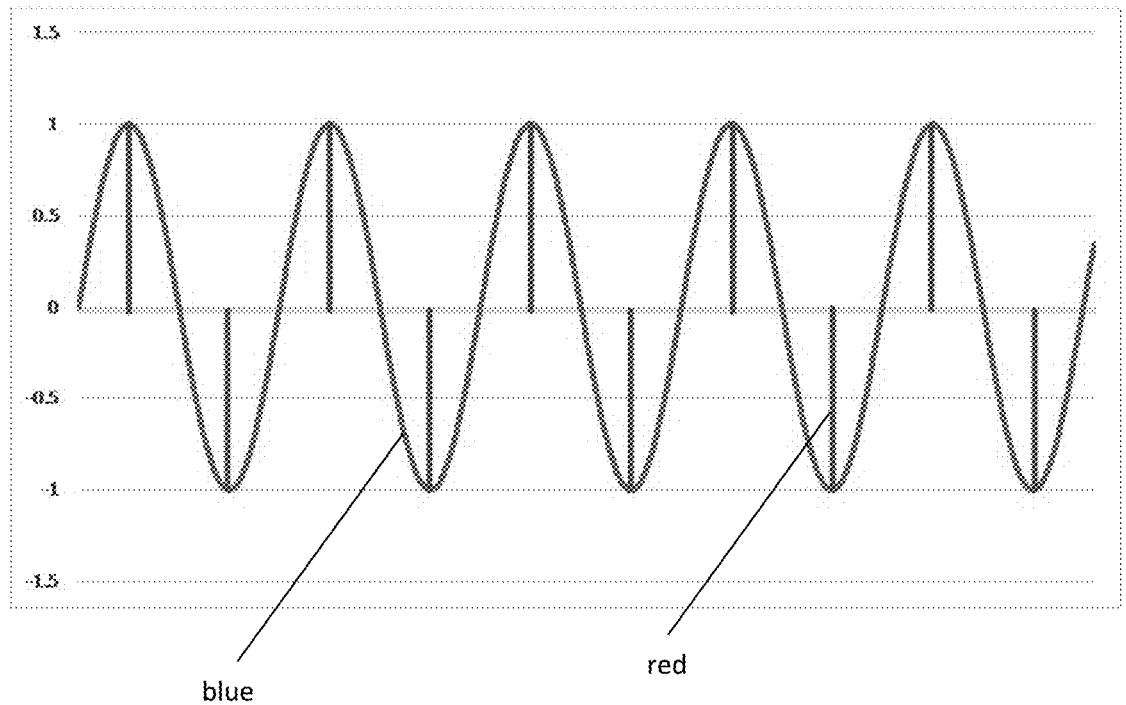
Figure 2A:
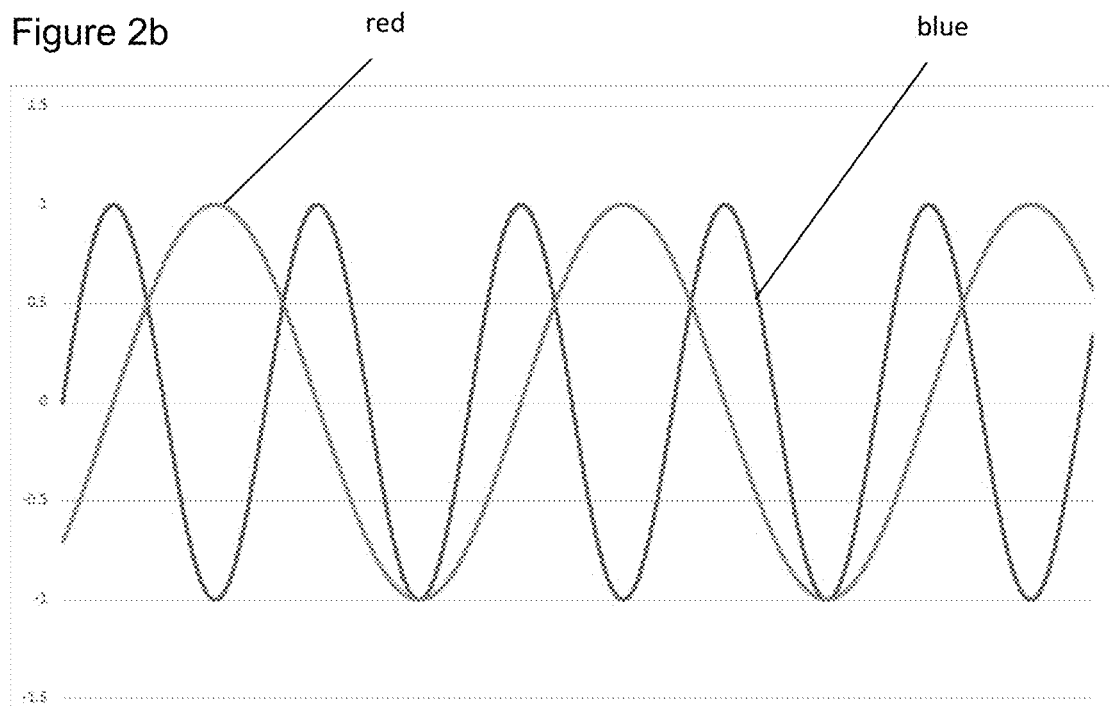

In FIG. 2a, a continuous waveform is received and sampled at the Nyquist rate, every 180° or $\pi$ radians.

In FIG. 2b, the waveform from (a) is decomposed to form 2 sub-pulses, the first of which is shown.

Figure 2C:
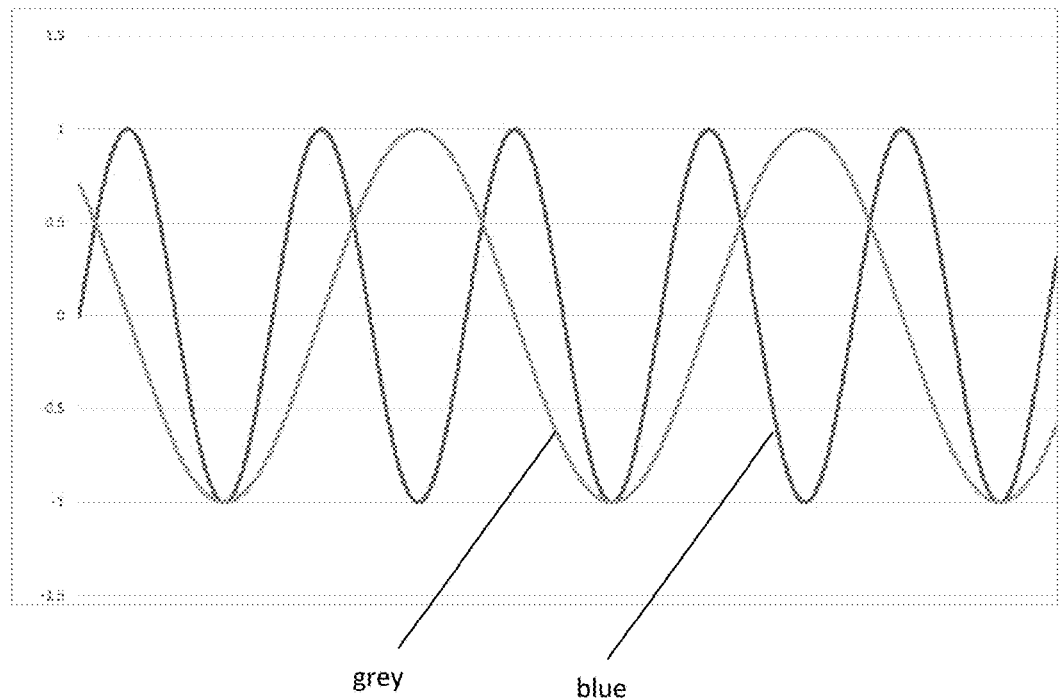

FIG. 2c shows the second sub-pulse obtained by decomposing the waveform in (a) into sub-pulses.

Figure 2D:
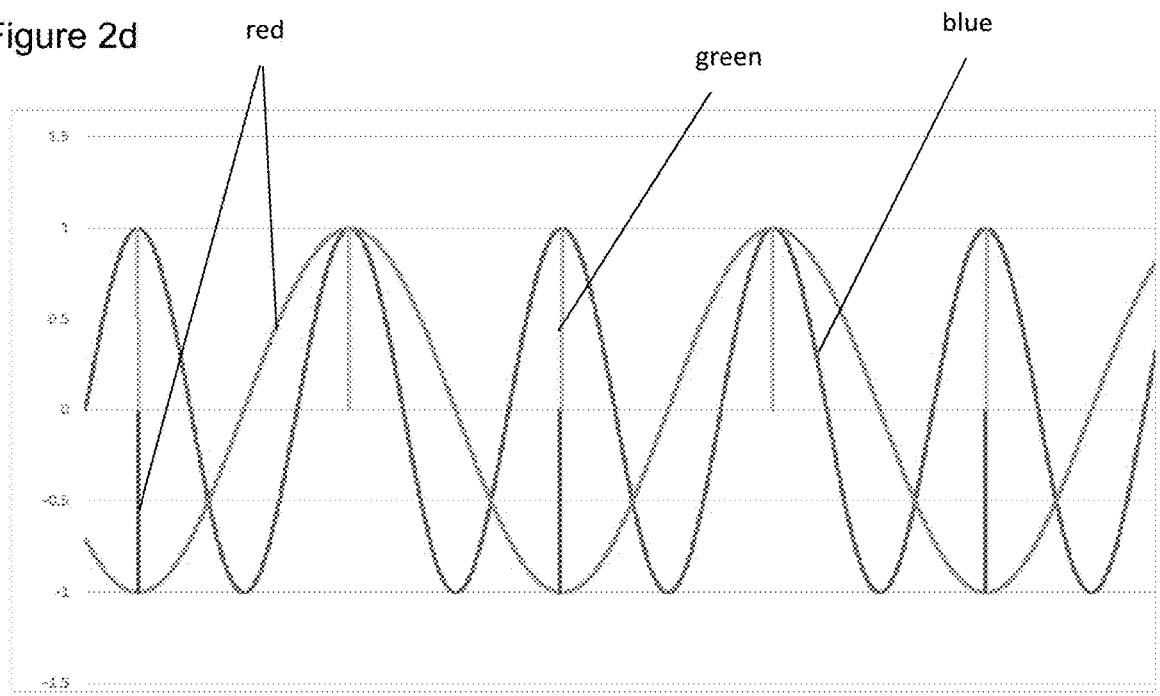

In FIG. 2d, the first sub-pulse is digitized at the Nyquist rate for its frequency, showing samples every 180° or $\pi$ radians. This is half the sample rate (in samples/s) used for the original waveform in (a). Every second sample's value has to be multiplied by −1 to correspond to the original continuous waveform's value.

The sample values used are in green lines, the sample values obtained, if different, are red.

Figure 2E:
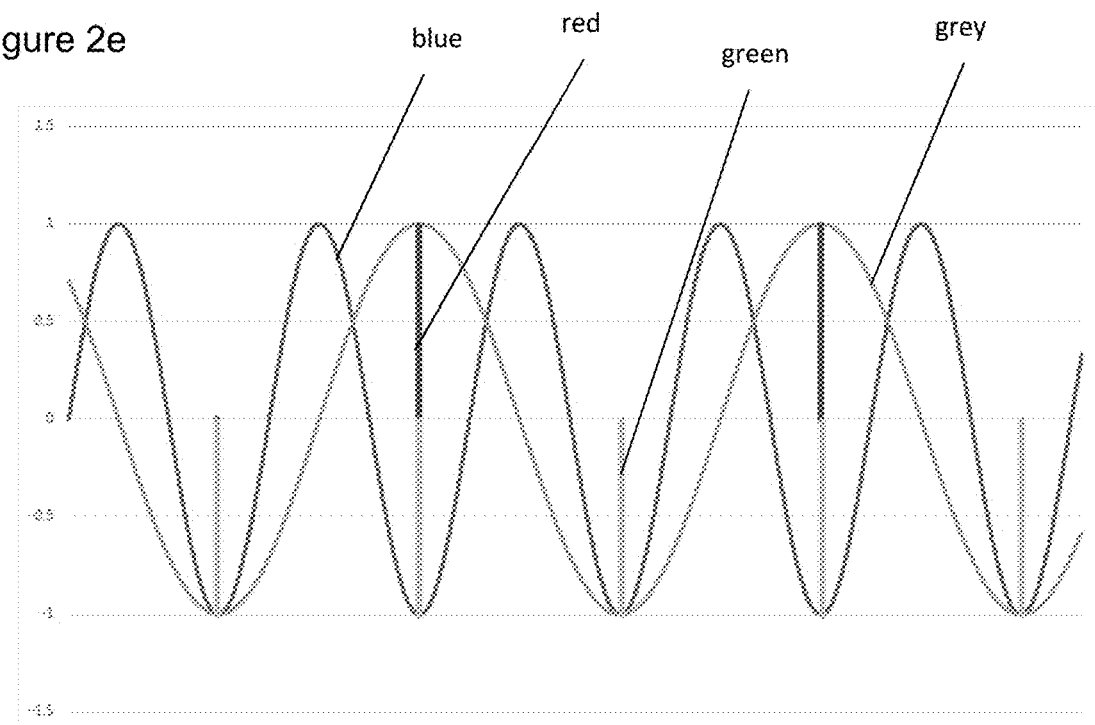

In FIG. 2e, the second sub-pulse is digitized at its Nyquist rate, also half the rate used in (a). Again, second sample's value has to be multiplied by −1 to correspond to the original continuous waveform's value.

The sample values used are in green lines, the sample values obtained, if different, are red.

Figure 2F:
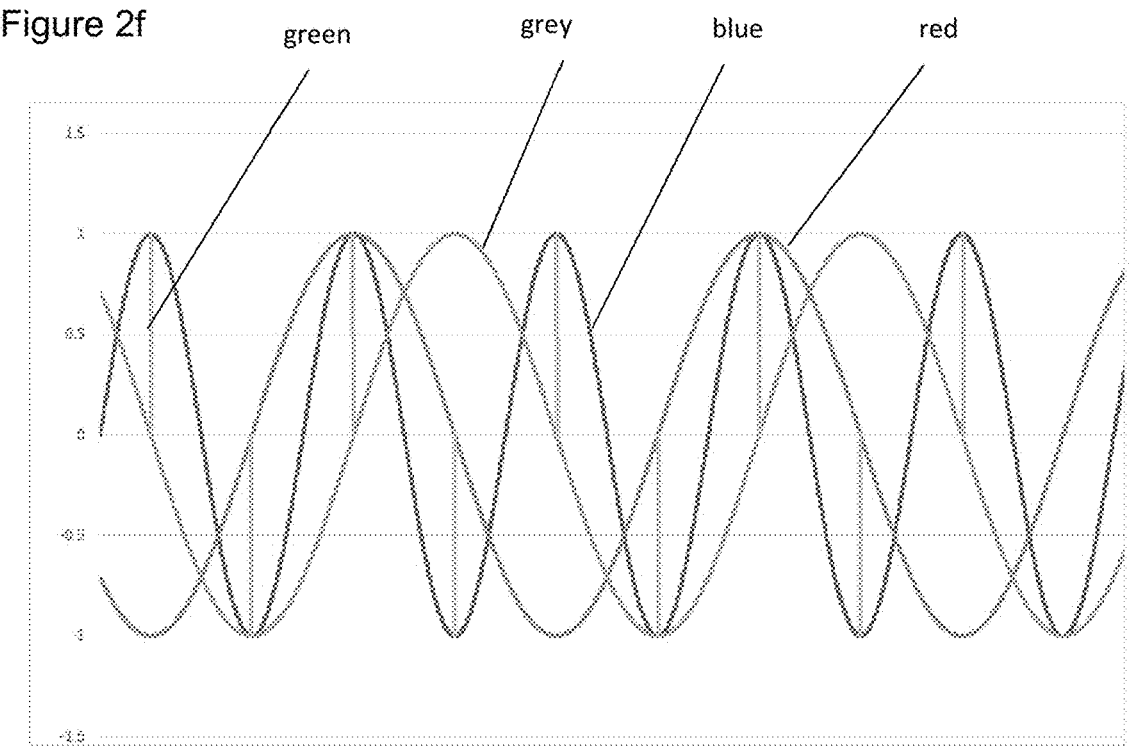

In FIG. 2f, the three waveforms and pulses are superimposed, and it can be seen that the sample times and sample values are the same when (b) and (c) are combined as those in (a).

In acoustic applications, these rises in effective frequency that ITDM-2 can provide can be significant.

In sonar systems, there is usually a range/resolution trade-off—to get long range, a low operating frequency is required; and to get high angular resolution, a high operating frequency is required. Sonar systems are based on the 'best' trade-off of those properties for the function being performed by the sonar.

For ultrasound, the angular resolution of high operating frequencies is traded off against the component cost of building devices that can operate at the high frequencies required.

The approach described above solves the issue of such trade-offs—sonar can give the required resolution at the required range, and ultrasound can provide the necessary angular resolution at lower cost.

In terms of the amount of data obtained, ITDM-2 allows the same data to be acquired as would transmission/reception at the effective frequency. If, for example, the operating frequency is 50 kHz and the effective frequency desired is 500 kHz, that means that 10 sub-pulses must be transmitted to create the data that would be produced by a 500 kHz transmission. If the 500 kHz transmission were 50 cycles long (where a cycle is a 'complete' wave, i.e. a waveform rising from zero to maximum amplitude, then to minimum (or maximum negative) amplitude, and a return to zero), then each of the sub-pulses would be of the same duration: 50/500,000=0.1 ms.

In other words, the required duration of a sub-pulse may be calculated by dividing the number of cycles present in the single, effective pulse, by the effective frequency of the effective pulse.

In this example, the combined length of all those sub-pulses is 1 ms (no delay is included in the total pulse time when combining into a multiplexed sample).

So, in earlier example, Nyquist sampling of the effective frequency—1 MHz—would be replaced by Nyquist sampling of the operating frequency—100 kHz; but the overall duration of the sampling is 10 times longer, so the same number of samples of the pulse are acquired. Because the sub-pulses are formed so that the samples obtained are equivalent to the samples that would be obtained from a pulse at the effective frequency, the data obtained is the same for both forms of transmission.

A potential application for the ITDM methods is in demodulation (for example, I/Q demodulation) of a reflected signal.

Usually, I/Q information is performed by sampling at 4 times the highest frequency—that is, the in-phase (I) component is sampled at the Nyquist rate, as is the quadrature (Q) component, with a $\pi/2$ (90° or $\lambda/4$) phase angle between the I and Q samples. This is discussed in more detail, referred to as ITDM-3, below.

The same approach can be adopted with ITDM-1 or 2 as discussed above—if the operating frequency is 50 kHz, for example, the Nyquist sampling rate is 100 ksamples/s, which means that the I/Q sampling rate is 200 ksamples/s. The same data is obtained using 200 ksamples/s I/Q sampling as would be obtained using 2 Msamples/s I/Q sampling of a 500 kHz signal; the same amount of information is obtained, it simply takes 10 sub-pulses to be sampled to obtain that data.

A further benefit of ITDM-1 or 2 is that bandwidth sampling can be used.

In other words, the present invention may provide a method of performing demodulation (for example, I/Q demodulation) of a sound wave, wherein a first reflection provides an in-phase (I) sample and wherein a second reflection provides a quadrature (Q) sample.

In a sonar system an effective frequency of 502.5 kHz may be desired, which is chosen primarily for the angular resolution that the frequency would deliver. A standard range resolution for commercial sonars is 1 cm, and is defined as $$RangeResolutionInMetres = c/(2B),$$

where c is the velocity of sound in water and B is the bandwidth used. This means that 1 cm resolution requires a bandwidth of 75 kHz in water with a velocity of 1500 m/s. Undersampling or Nyquist sampling can provide this bandwidth:

$$x(n) = \sin(2\pi f o n t s) = \sin(2\pi (fo + kfs)nts)$$

where x(n) is the sample n data obtained, fo is the signal frequency, fs is the A/D sample rate, is is the time of a sample, and k is the undersample value that pertains (which may be selected to provide Nyquist sampling).

The above equation is seen on page 38 of 'Understanding Digital Signal Processing 3/e' by Richard G. Lyons, which also states that:

"When sampling at a rate of fs samples/second, if k is any positive or negative integer, we cannot distinguish between the sampled values of a sinewave of fo Hz and a sinewave of (fo+kfs) Hz."

By this formula, if, for example, k=6 were used with a sample rate of 150 ksamples/s, 1 cm range resolution would be obtained, though the actual frequency being sampled is from 900 kHz to 1050 kHz (1.05 MHz), moved down to the 0-150 kHz frequency range by undersampling.

Therefore, a sample rate of 150 ksamples/s is required, giving an effective sample rate from the equation above of (7×150 ksamples/s=) 1.05 Msamples/s.

So, sampling the effective frequency data at 150 ksamples/s would give the 1 cm range resolution data from the 502.5 kHz operating frequency.

Using ITDM-2, the effective frequency is still 502.5 kHz, so if n=10 the operating frequency is 50.25 kHz; and an effective sample rate of 150 ksamples/s means a 150/10=15 ksamples/s sample rate is required to obtain the same information from the 50.25 kHz operating frequency data as would be obtained from the 502.5 kHz effective frequency data sampled at 150 ksamples/s.

The total amount of data obtained over 10 sub-pulses at 50.25 kHz (the operating frequency) is the same as that obtained from one pulse if working at 502.5 kHz (the effective frequency).

The undersampling and restricted bandwidth acquired do not affect the angular resolution of the system, which (in acoustic terms) is $$(50.8/ArrayLengthInLambda)°$$

with reference to 'An Introduction to Underwater Acoustics: Principles and Applications (Springer Praxis Books)' by Xavier Lurton, page 184.

Combining an ITDM method, as set out above, with bandpass sampling allows for comparatively low sampling rates.

Further, ITDM-1 and ITDM-2 can be used in conjunction. The objective is to obtain the same data samples as would be obtained if the operating frequency and an appropriate A/D rate were used. So, ITDM-1 allows one to obtain the same data by undersampling the operating frequency; and ITDM-2 allows one to obtain the same data by Nyquist sampling the operating frequency equivalent sub-pulses. One can undersample those operating frequency sub-pulses, so that the sample rate to obtain the required data is even lower. The result of this approach is to require more transmissions of sub-pulses to allow that data to be obtained.

Further, the bandpass sampling outlined above can also use the undersampling approach—rather than sampling the operating frequency at 15 ksamples/s, as in the above example, each of the 10 operating frequency sub-pulses could be transmitted twice, allowing a sample frequency of 7.5 ksamples/s to be used.

The method of ITDM-2 provides baseband bandwidth sampling of the received waveform, where the baseband bandwidth includes all of the frequencies present in a signal, i.e. all of the information. ITDM-2 requires that extended sequences of sub-pulses must be transmitted. But in many applications (e.g. multibeam sonar systems), the baseband bandwidth is not required; all that is wanted is the best achievable angular resolution and range resolution.

The below method will be referred to as ITDM-3. Conventionally, undersampling is used to obtain enough information from the received signal to supply the required angular and range resolutions, and ITDM-3 can be thought of as an undersampled version of ITDM-2.

ITDM-3 is based on undersampling by reducing the number of sub-pulses transmitted, rather than using the sample rate reduction form of undersampling described above.

ITDM, as explained so far, involves the transmission of many cycles of a waveform in each sub-pulse. But this transmission can be drastically reduced by using the ideas behind conventional undersampling.

The basic concept of undersampling—so as to obtain useful I/Q data—is to sample the received signal less frequently than baseband bandwidth would require, but frequently enough to obtain the bandwidth that the desired range resolution requires, and to obtain the appropriate phase information for angular resolution. This allows reducing the transmissions markedly.

Going back to the initial explanation and example of ITDM-2, the first samples of data are produced from the first sub-pulse of transmission. This first sub-pulse gives the in-phase (I) data.

Similarly, a further sub-pulse can give the Q data. The method would be to transmit the same sub-pulse again, but at a quarter sample interval offset for the sequence (i.e. $\pi/2$ of operating frequency phase, giving $2n\pi+\pi/2$ at effective frequency). This ensures that the Q sub-pulses are correctly timed to give quadrature data—samples at $\pi/2$ and $3\pi/2$ with the I data being samples at 0 and $\pi$. The same I/Q data may be obtained by using twin sub-pulses for each of I and Q, raising the signal-to-noise ratio "SNR".

Other methods can be used to obtain quadrature spacing between sub-pulses. For example, the interval between sub-pulses can be shorter, so that it gives quadrature delay at a higher effective frequency, rather than at operating frequency. This may allow a known effective frequency phase shift to be obtained, giving the same information as a quadrature signal (though, possibly, a little less efficient and more noise-susceptible).

Interference between sub-pulses may be minimised by using 'orthogonal' pulses, or by using positive-magnitude half-cycle pulses for I and negative half-cycles for Q (or vice-versa), for example.

The I/Q data obtained is that which would be obtained by bandpass sampling an effective frequency signal; sample timings that give those values are obtained by modifying the transmission time of the sub-pulses, whilst keeping the receive sample rate constant.

For ITDM-3 to obtain I/Q data that gives the angular resolution of the effective frequency, two sub-pulses must be transmitted, at appropriate intervals. Overall, the two sub-pulses transmitted give 4 samples, 2I and 2Q, which are at a known offset from each other in terms of transmitted signal phase. So, by transmitting the 2 single-sine-cycle sub-pulses, each sampled twice as an echo is received, I/Q data is obtained for any reflection.

As is standard for I/Q data, the 4 samples' values can be resolved to obtain the phase and magnitude of the effective frequency waveform being received (in the form of two sub-pulses at operating frequency).

Two sets of two sub-pulses may be transmitted, at appropriate intervals—i.e. pairs of sub-pulses, for example. This would give I and Q data pairs. Although the I and Q data pairs are separated at effective frequency by more than the $\pi$ radians that are used by default, it can be assumed that the extra $n\lambda$ (or $2n\pi$ radians) are not present, as they have no effect—the I data can be taken to be sampled at 0 and $\pi$ radians, the Q data at $\pi/2$ and $3\pi/2$ radians, as is usual.

Given that the I/Q data are correctly timed relative to each other, it is not necessary for them to occur at a well-defined offset timing; this means that multiplexed versions of the signals are useable, if the multiplexed data from a given array element is available to the A/D system at the correct time (in terms of effective frequency phase) relative to previous multiplexed data from that array element. For example, the offset need not be an exact number of operating frequency half-cycles; the offset of each of the 2 I and Q sub-pulses can be such that the I samples are at $n\pi$ and $(n+1)\pi$ in effective frequency radians, and the Q sub-pulses at $(n+1)\pi/2$ and $(n+3)\pi/2$ in effective frequency radians. In that case, the received signal would still comprise valid I/Q observations.

It may also be the case that, when I/Q undersampling is being used in this way, it is not necessary to transmit entire sine cycles—for example, the I transmission can be of a positive half-cycle, and the Q transmission of a negative half-cycle. Again, the data obtained is valid I/Q undersampled data that is substantially identical to what would be achieved if multi-cycle transmission were taking place at effective frequency.

There may be zero (or negligible or substantially zero—i.e. very short compared with the length of a pulse) delay between I and Q sub-pulses. If two sub-pulses are transmitted at different operating frequencies, where the sample rate is fixed, the resulting effective frequencies will be different. The effective frequencies are a fixed known value, which are not selectable post-receive, so the phase angle between samples at each frequency is derivable algebraically.

This may be used in relation to any two sub-pulses but could, in particular, be used in I/Q demodulation such that I/Q data can therefore be calculated from continuous (i.e. zero, or negligible or substantially zero, delay) transmission of sub-pulses at different frequencies.

For example, instead of I and Q sub-pulses, it may be sufficient to transmit a first sub-pulse and a second (or further) sub-pulse wherein the phase difference between the sub-pulses is known (and fixed). As above, transmission may be continuous or there may be a negligible delay). This known phase difference at transmission may allow the phase difference of received (i.e. reflected) pulses to be determined through analysis—for example, algebraically. In other words, the principles of I/Q demodulation may be applicable to the first and second sub-pulses, but the I/Q phase restriction may not be required in order to acquire useful data for sampling. The phase difference may be $\pi/2$ as in standard I/Q, close to $\pi/2$ (to achieve near-quadrature samples) or may be smaller than $\pi/2$.

The first sub-pulse may have a first frequency and the second (or further) sub-pulse may have a second (or subsequent) frequency. At least one of the first sub-pulse and the second (or further) sub-pulse frequency may be determined based on the maximum sampling rate of the receiver.

The SNR should be considered where the phase difference deviates from the standard I/Q definition, in terms of error in phase measurement.

As in the examples above, it may be that undersampling is performed—i.e. that replica first or second (or further) sub-pulses may be transmitted.

Once phase information for two (or more) effective frequencies is known, based on the known frequencies of two (or more) transmitted sub-pulses, it is possible to determine the relative distances traversed by the two (or more) sub-pulses—as a multiple of sine cycles. This, in turn, indicates the distance to the target (i.e. which caused the sub-pulses to be reflected) in multiples of sine cycles.

In other words, the target provides a medium from which the sub-pulses are reflected. This creates the pulses to be received and analysed. The distance traversed by a sub-pulse before reflection indicates the distance from the point of transmission of the sub-pulse to the target. The distance is measured as a multiple of sine waves.

This information may be used in beam forming, for example in sonar applications.

Different distances to the target in multiples of sine cycles for different effective frequency waves may indicate that the cycle count—i.e. the distance to target in multiples of sine cycles—would differ across an array of receive elements. The information would therefore be useful in calibration of signals and data interpretation in sonar applications, for example.

The sub-pulses in the case where there is zero or negligible delay may each be a positive or negative half-cycle, so that the transmitted waveform would be a positive half-cycle at a first frequency, followed by a negative half-cycle at a second frequency (or vice versa).

This minimal set of ITDM data is ITDM-3. The other form of resolution—range—obtained in this method is derived from the effective number of cycles used, which is the number of effective frequency cycles between the two samples of the echo (which can be I and Q samples); that is, $(n\lambda+\lambda/4)$ of effective frequency (for I/Q data), so the same range resolution as n-and-a-quarter-cycles of the effective frequency would provide. Some applications might want poorer range resolution than this, and that can be implemented by increasing the effective number of cycles, by increasing the number of cycles in each of the sub-pulses transmitted.

Obtaining I/Q data thus far has been based on 4× oversampling as widely used in conventional systems. In those systems, the advantage and attraction of 4× oversampling is that the sin( ) and cos( ) functions are alternately 1, 0, −1 and 0—so only two of the four samples obtained per cycle are necessary to give the I/Q data.

The present method may use sampling at 3× the frequency, rather than 4×. This would mean samples being obtained every 120° ($2\pi/3$) rather than every 90° ($\pi/2$) when 4× sampling is used. But enough information is obtained using the 120° interval to allow I/Q to be derived, using a lower (cheaper) sample rate. This may be achievable using FPGA (field-programmable gate array) and similar computation and calculation methods.

Another benefit that can be obtained from the oversampling to obtain I/Q data is that—given that the sample interval is known very accurately—the received signal phase and magnitude derivation can be accompanied by a derivation of the sub-pulse frequency—that is, the frequency of the received effective frequency, meaning that the Doppler shift (wavelength shift in sound waves due to the relative motion of the transmitter 2/receiver 3/target) of the data is known. This allows the derivation of the velocity of the target 5 relative to the transmit/receive locations. For a conventional system using 4× oversampling, the extra mathematical manipulation necessary to obtain frequency shift information would be a problem to add to the system; however this is straightforward in an ITDM system of some embodiments of the present invention.

The present inventor has considered that the number of samples used to form a beam in ITDM-3, for an echo at a given range, is far smaller than in the baseband bandwidth case. This means that the SNR is decreased (as SNR depends on the square root of the number of samples being used). Again, the trade-off can be made between number of sub-pulses transmitted versus SNR obtained—as the number of sub-pulses is reduced, the SNR falls, and vice-versa. It is worth acknowledging, though, that continuous waveform (CW) sonars tend to use about 4 cycles per ping (i.e. transmitted pulse) at operating frequency, while sampling at twice operating frequency. So, 8 samples per ping is typical; obtainable in ITDM-3 by making the sub-pulses twice as long (if I/Q samples at $\pi/2$ intervals are being used). This would not affect the angular or range resolution obtained, but would improve SNR.

ITDM-3 shows that the information required for high angular and range resolution can be obtained by transmitting two low-frequency sub-pulses at an offset of half sample period, and sampling each of them at the Nyquist rate; this gives I/Q data for the reflection from a target 5. This is a reduction even on the signal transmission requirements of IDTM-1 and -2—achieving a result of equally high quality.

A further modification of ITDM is to increase the sample rate. So far, for ITDM-2 and ITDM-3, the sample rate has been assumed to be Nyquist—the rate is twice the maximum frequency in the signal. If, instead, conventional I/Q sampling of the received signal is employed—the I and Q each sample at the Nyquist rate, but at 90° or $\pi/2$ to each other—the same information can be obtained from a single transmitted pulse.

Conventionally, the samples obtained are interpreted as being samples of a frequency of less than or equal to half the sample rate (e.g. a signal of 50 kHz if one is sampling at 100 ksamples/s). The ITDM-4 interpretation, as will now be set out, is that the sample obtained is for a frequency as defined in the Lyons equation ([Lyons p 38], see above), in which case the sample of a 50 kHz signal obtained at 100 ksamples/s can be a sample of 50 kHz, 150 kHz, 250 kHz, 350 kHz, etc. The frequency may be determined (i.e. what the effective frequency is) based on the angular resolution required. If a frequency of 350 kHz would result in the angular resolution needed, then each of the 2I and 2Q samples may be interpreted as using that frequency.

Although the phase offset at 350 kHz will be different from the phase offset between I and Q at 50 kHz, in this example, the phase difference is always suitable for calculating I and Q data. For an effective frequency of 350 kHz, using a sampling rate of 50 ksamples/s, 7 cycles occur at 350 kHz for each 1 at 50 kHz. So the I samples which take place at 0 and $\lambda/2$ at 50 kHz take place at 0 and $7\lambda/2$ at 350 kHz, so at 0 and 7 radians, with a 3 cycle interval at 350 kHz; the Q samples take place at $\lambda/4$ an $3\lambda/4$ at 50 kHz, so $7(\lambda/4)$ and $7(3\lambda/4)$ at 350 kHz, so $7\pi/2$ and $21\pi/2$ radians—so in quadrature to the I samples. The quadrature relationship is always the case for any effective frequency chosen (it is a property of all the effective frequencies the Lyons equation above makes available). All of those I and Q samples are within the 7 effective frequency (350 kHz) cycles that occur within each 50 kHz operating frequency cycle. The sample data can still be formed into simultaneous equations and solved to give phase and magnitude information for the 350 kHz option. Although no 350 kHz signal was present in this example, the data obtained can be interpreted as 350 kHz data. It is as correct to interpret it as 350 kHz data as it is to interpret it as 50 kHz or 250 kHz data.

This seems a significant revision of the method for dealing with an incoming received data stream—rather than treating it as being a stream at the frequency as known was transmitted, instead one uses the known sample rate to interpret the data so as to improve the angular resolution obtained.

Another advantage of this approach—also true of ITDM-3—is that the effective frequency chosen need not be fixed for a given ping: the effective frequency chosen can be varied with range, so that higher angular resolution is obtained at longer ranges by choosing a higher effective frequency.

So, angular resolution has been identified. This leaves range resolution. As mentioned previously, the range resolution is defined by the bandwidth of the sampled received signal. Thinking of the in-phase (I) data only, in ITDM-4 that bandwidth is equal to half of one cycle of the operating frequency of the signal; this is 2f, twice the operating frequency. So for a 50 kHz single-cycle pulse, for example, the range resolution in water is 1500/(2*2*50,000)=0.75 cm.

If poorer range resolution is required, the number of cycles per pulse can be increased. If better range resolution is required, there are options. Of course, if I/Q data is being obtained, the range resolution is twice as good as if only I data is being acquired. One way to further improve the range resolution is to increase the sample rate of which the system's ND is capable—that increases the bandwidth of the signal obtained, so increasing the range resolution (up to the point where the sample rate is equal to the sample rate for the effective frequency—that is the maximum resolution that can be achieved). Another option is to use ITDM-1 to increase the sample rate by transmitting multiple sub-pulses.

Practically in acoustic applications, some beams of sound waves may not propagate and reflect along the same axis as the main part of a pulse—i.e. there may be some weak off-axis transmission. Should a receiver register a reflection of an off-axis beam as a reflection of the main pulse, any resulting image including information from the off-axis beam reflection may create an artefact—i.e. a mistake—in the image. The artefact may appear as clouding in the image, or as a spurious structure, for example.

Grating lobes are an artefact of an acoustic imaging system which occur where the spacing between array elements is too great.

Another benefit of ITDM-3 is that, if only a single cycle of operating frequency signal is transmitted, it is possible to avoid grating lobes, even if the array elements are so far apart that grating lobes would usually be an issue.

To avoid grating lobes in this situation, the transmission interval between sub-pulses is set to be such that the sub-pulses will have travelled more than the distance between the array elements. So although grating lobes could occur if 2 or more cycles were being transmitted, with only one cycle per sub-pulse, no grating lobe is possible as the sub-pulses are too far apart.

As with ITDM-3, the method of ITDM-4 may use undersampling to obtain a sampled signal bandwidth that is compliant with the Nyquist criterion. Also as for ITDM-3, this method is compatible with multiplexing—so long as the I and Q samples are obtained at the correct time intervals, the actual time of each of the samples is not important, and does not affect the resolution of the system.

Each form of ITDM may require:

the versions of the sub-pulse transmitted to be sufficiently identical;

consideration that the medium through which the set of sub-pulses is travelling may affect them differently, so the pulses arriving at the receiver may require altering;

consideration that the sub-pulses may interfere with each other, so that the received versions are distorted;

consideration that the transmitter 2 or receiver 3 or target 5 may move enough during the process that the timing of the reception of the echoes is changed, and the data obtained is different from that of normal Nyquist sampling of a single reflected pulse;

sufficiently accurate timing of the pulse transmissions and of the sampling to create the Nyquist sampling accurately;

a sufficiently strong correlation between the intended transmitted effective frequency pulse and the actual received pulse to allow accurate range data and angular data to be obtained;

consideration that each of the ITDM methods may not give the angular resolution of the effective frequency, by way of the present methodical steps.

Having the versions of the sub-pulse sufficiently identical may be achieved by ensuring that the transmitted waveform is of known quality and will not change from sub-pulse to sub-pulse. This is achievable using the appropriate electronics, which allow each of the multiple repetitions of a waveform to be identical and the samples to be timed accurately. In any event, ITDM-4 does not require consideration of whether sub-pulses are identical, as only one sub-pulse is used.

The medium through which a set of sub-pulses is travelling may affect the sub-pulses differently, so that the sub-pulses arriving at a receiver are not identical. This is a consideration in the case where the medium can affect each of the sub-pulses differently, so that they no longer combine to give the higher bandwidth effective frequency pulse. It should be considered, though, that all current methods for sonar, ultrasound and radar assume that the medium treats the travelling waveform consistently—otherwise the correlation between the transmitted waveform and its received reflected version would be poor due to the changes in the waveform caused by changes in the medium. In the short duration of a pulse's transit through any region of a medium, that medium does not change significantly enough during the transit of the pulse through it to substantially affect the waveform. Using the ITDM methods described above, the same assumption can be made. Realistically, for small changes in frequency—doubling or tripling—the extra time taken for the 2 or 3 sub-pulses to transit through the region makes a change in that region of the medium unlikely. For larger (100 or 1000, for example) changes using ITDM-2 (but not ITDM-3 or ITDM-4, which may not be affected), it is conceivable that the medium might have a more substantial effect, and may make the data less useful. How quickly medium properties must change in order to have an effect (i.e. an adverse effect) is not known; it is therefore not know how high a frequency shift has to be before it is likely that data could be adversely affected.

CHIRP sonar systems (see below) vary the frequency of a signal over time. This results in a pulse compression effect when received pings are correlated with the transmitted signal.

An example of an industry-standard DST (Digital Sonar Technology) system is a CHIRP (Compressed High Intensity Radar Pulse) sonar, which may operate at 325 kHz over a range of 300 m, with a CHIRP pulse of 400 μs (approximately 130 cycles of CHIRP).

Therefore, ITDM may operate using an operating frequency of 50 kHz to generate 500 kHz effective frequency, if the overall pulse length is 400 μs (0.4 ms) or less. Fewer CHIRP cycles may be sent, compared with the industry standard (other aspects of ITDM make the pulse compression correlation process more reliable than for a conventional CHIRP sonar, as discussed below).

It is known that CHIRP sonars may use pulse lengths (i.e. durations) which are 10 to 50 times longer than monotone (CW) sonars. The shortest feasible sonar pulse length is 1 cycle, and 4 is more likely—this implies a CHIRP pulse length of between 10 and 200 cycles; this would give a pulse duration of between 0.03 ms or 0.2 ms for transmissions at 300 kHz, and between 0.67 ms and 4 ms for transmissions at 50 kHz, for example.

In general, sonars 'work' if the pulse length is around 0.5 ms or less; if ITDM exceeds that pulse length it may operate less successfully—maximum pulse length is therefore an important consideration. However, it is not known that a problem will arise, without doubt, if the pulse length exceeds some known duration.

It may be that an overly-long pulse length will be a problem in extreme circumstances (where hundreds of sub-pulses are used to allow long-range high angular resolution to be obtained, for example), but for more limited cases—doubling or tripling the operating frequency to obtain an effective frequency—it would not be a significant issue.

In any event, by definition, this is not a relevant problem for ITDM-3 or ITDM-4.

The sub-pulses may interfere with each other, so that the received versions are distorted. In-pulse interference already exists in conventional sonars, in that two targets 5 which are less than a pulse-length apart will produce overlapping reflections, and the system may have difficulty correctly identifying the number of reflectors and the intensity of those reflections. Each of the sub-pulses transmitted in sequence are of the same length (in time or metres) in some embodiments of the present invention, as the pulse desired at the effective frequency (for ITDM-1 and ITDM-2). So, if a system is transmitting at 50 kHz operating frequency, for example, and creating the effect of a 500 kHz, 200 cycle ping, then each sub-pulse transmitted is the same duration as 200 cycles at 500 kHz, or 200/500000=0.4 ms. This means that if two targets 5 are within 0.4 ms of each other, in terms of velocity of the waveform, then there will be interference between the echoes of those targets 5.

But that interference will be produced at the same relative time (distance) for each sub-pulse, so will mean that the interference takes the same form as 500 kHz interference. So, the interference produced using this method is the same as would be experienced if the effective frequency and pulse length were actually being transmitted. It is also the case that, for ITDM-3, the number of sub-pulses is smaller, and each is shorter, and therefore inter-pulse interference is less likely to occur.

And, once more, this problem is one that cannot occur in ITDM-4.

The transmitter 2 or receiver 3 or target 5 may move enough during the process that the timing of the reception of the echoes is changed, and the data obtained is different from that of normal Nyquist sampling of a single reflected pulse. This may be the most significant consideration for ITDM-1 and ITDM-2. In conventional systems—sonars or radars—the Doppler frequency shift caused by relative motion of the transmitter 2, receiver 3 and targets 5 is straightforward to identify, quantify and remove. If a target 5 is moving fast, its echo is at a different frequency from a target 5 that is not moving relative to the transmitter 2/receiver 3. That change in frequency can be measured, then the data samples obtained can be adjusted, and the Doppler effect removed, as the correlation with the transmitted pulse is performed. This process can be used with ITDM-4.

For the ITDM-1 and -2 methods described in this document, there are further considerations. Relative motion of the target 5 means that the interleaved samples are for different portions of the target 5 than would be the case if there were no relative motion; and the effect is cyclical, not consistent throughout the echo. However, it is possible to perform a correlation process within and between sub-pulses to determine if the transmitted pulse reflection has been compressed or extended by relative motion. In a similar way to the treatment of Doppler in conventional systems, the sub-pulse echoes can be adjusted to remove the motion effects, then processed in the normal way. It may still be the case that the relative motion reduces the quality of the data obtained, and that the relative motion becomes a known limitation of the system.

ITDM-3's response to Doppler is simpler—the sub-pulses transmitted can all be expected to be subject to the same Doppler effects. Doppler can be measured by the change in frequency of those sub-pulses, and once known, can be used to correct the data obtained.

The timing accuracy of the pulse transmissions and of the sampling must be accurate enough to create the effective frequency sampling accurately. This issue is fundamental, but may be solved in the following manner. Nearly all forms of A/D conversion rely on an external clock, created as part of the electronics design process. It is standard that the clocks used in electronics hardware are more than accurate enough to make changes in sample time over a few milli-seconds to be insignificant. Therefore, the requirement that the timing accuracy of the transmissions and of the sampling is sufficient to create accurate effective frequency sampling may be addressed using the design of the relevant system.

The correlation between the intended transmitted effective frequency pulse and the actual received pulse must be good enough to allow accurate range data and angular data to be obtained. It is important to ensure that the transmitted sub-pulse is an accurate representation of the appropriate components effective frequency waveform. As discussed below, this may involve higher sample rates—higher than the Nyquist sampling rate—being used during the formation of the transmitted sub-pulses.

Considering angular resolution, in ITDM-1, the method obtains the same sample values at the same sample time (relative to the sub-pulse start time) as a higher sampling rate would achieve. The angular resolution available from a higher transmitted frequency is obtained using ITDM-1.

For ITDM-2, ITDM-3 and ITDM-4, the angular resolution is the result of the samples obtained being attributable to a higher frequency than was actually transmitted (i.e. effective frequency instead of operating frequency). It is known that the operating frequency originated from the system's 1 transmitter 2, and the received signal is the reflection from a target 5. So the operating frequency signal is dependent on the target's 5 range and position relative to the system's 1 transmitter 2. This means that the effective frequency is a waveform which is parallel to the operating frequency waveform, so is indistinguishable from an operating frequency which is as high as the effective frequency—it is the same as if it was transmitted by the system and reflected by a target 5. This means that the effective frequency data obtained can be used to derive the same angular resolution as it would deliver as an operating frequency.

Other aspects of system performance can be affected by ITDM. For example, grating lobes. It is clear for all systems that grating lobes do not occur if the spacing between an array's elements is less than half the wavelength, $\lambda/2$ (see 'An Introduction to Underwater Acoustics: Principles and Applications (Springer Praxis Books)' by Xavier Lurton, page 202.

A system that was designed to operate at the effective frequency would have elements at the spacing that meant that grating lobes would not occur at that frequency. But if ITDM is used, with n=10, for example (i.e. an operating frequency 1/10 of the effective frequency), that array spacing may not still be necessary. The same array size (defining the angular resolution that can be achieved) could be populated by elements which are further apart. It is clear that the elements must be at spacing less than that $\lambda/2$ of the operating frequency. This means that grating lobes will not occur at that frequency. But given that the effective frequency pulse is derived by combining the sample data from operating frequency sub-pulses, that implies that the phase of each sub-pulse is correct and cannot be the result of a grating lobe occurring at the operating frequency; which further implies that the reconstructed effective frequency pulse has correct phase, and no effective frequency grating lobes can occur. So prevention of grating lobes in ITDM means having array elements that are no more than the $\lambda/2$ of the operating frequency apart.

This implies a further, drastic, reduction in cost—in conventional sonar and ultrasound arrays, the element count and spacing is completely driven by grating lobe avoidance; having an option to avoid grating lobes and retain the range and angular resolution of the effective frequency at a rather lower operating frequency is, therefore, beneficial to users of such systems.

Another typical issue with acoustic and radar systems is sidelobes. These occur when the received waveform is at an angle to the receive array which allows one or more complete wavelengths (i.e. one cycle of a sine wave) to cover a portion of the array, leaving space for half a wavelength—half a sine cycle—to cover the rest of the array, when the angle is such that the sidelobe peak occurs. A null in the received signal response occurs at an incoming signal angle before sidelobe response begins; this is when the angle is such that $1\lambda$ of the incoming waveform completely covers the receive array, so the output from each array element is cancelled out by another element, and a zero summed output from all the elements results. (The same applies to sidelobes in single-element receivers of greater than $\lambda/2$ length).

In the case of ITDM, the sidelobe response relates to the sidelobes of the operating frequency, not the effective frequency. Given that the operating frequency is lower than the effective frequency, this means that the wavelength of the operating frequency is greater (as $\lambda=v/f$).

For example—for an operating frequency of 500 kHz, $\lambda$ in water is 3 mm. So, the null before sidelobes occur appears at an angle where the length of the extra distance travelled by the signal over the array length, d, is one wavelength, i.e. $d \sin \theta = \pm \lambda$, and for an array length, $d=80 \lambda$, that means that $\sin \theta = \pm 1/80$, so $\theta = \pm 1/80$ radians, or sidelobe nulls are at $\pm 0.716°$.

If the same actual dimensions (in metres) are used with an operating frequency of 50 kHz, for example, then $d=8\lambda$, and so $\sin \theta = \pm 1/8$, so $\theta$ is $\pm 7.35°$. The angle of the sidelobe null implies that the sidelobe peak is relatively close—the first sidelobe peak occurs when $d \sin \theta = \pm 3\lambda/2$, so at $\sin \theta = \pm 3/160$ or sidelobe peaks at $\theta = \pm 1.07°$ for 500 kHz operating frequency and at $\theta = \pm 3/16$ radians or $\pm 10.8°$ for an operating frequency of 50 kHz.

If sidelobes do not appear at a given angle in sub-pulses, then they are also not present in the effective frequency data produced from those sub-pulses. So sidelobes are at a larger angle when ITDM is used, than when the effective frequency is used as operating frequency for an array of the same physical dimensions. The number of elements in the array is not a factor in the presence or absence of sidelobes. Sidelobes are "always undesirable" (from Lurton p182) and need to be reduced by design of the system hardware and algorithms as much as possible; ITDM may usefully reduce sidelobe effects.

Another technique for improving the quality of the results from ITDM is to transmit extra sub-pulses. These would be duplicates (in terms of transmission timing as well as waveform) of sub-pulses already being transmitted, and the results may be improved by taking the summed values (or some other combination of the data) of the samples obtained and using those combined sub-pulses as the basis for pulse processing. If two copies of each sub-pulse were to be transmitted, that would reduce the effects of noise on the data. The number of copies of each sub-pulse could be increased to the point where noise was significantly reduced. But the number of copies of each sub-pulse that can be used in a single pulse will be limited, practically—for example, it will make the pulse more liable to disruption by relative motion of the transmitter 2, receiver 3 and targets 5. In cases where the time available per pulse transmission is limited (e.g. where a fast data rate out of the system is required), the duplication of sub-pulses might make the overall pulse transmission time too slow and only a single copy of each sub-pulse could be used.

Another mechanism that can improve data quality is to delay the transmission of sub-pulses so that each sub-pulse has had a propagation time that exceeds the maximum range of the system before the next sub-pulse is transmitted. This means that there is no within-pulse interference (i.e. interference between sub-pulses of the same pulse), so less interference than would be experienced when two targets 5 were close together in range using a pulse transmitted at the effective frequency. The time to send a complete pulse may be longer than if all the sub-pulses are sent in quick succession which is relevant to medical ultrasound systems—where the maximum range is short and well-defined, this approach could be used to improve data quality.

Grating and side lobes are much less of a problem when using ITDM compared with conventional transmission and reception. Another property of ITDM-1 and 2 is the reduced noise compared with straightforward transmission using the effective frequency as the operating frequency. In that standard case, any waveform interference that occurs at that frequency competes with the transmitted signal when the receiver correlates the incoming data. If CHIRP is being used, that may mean that the noise waveform is removed because it correlates poorly with the CHIRP being transmitted. But CW (continuous waveform) is liable to corruption from noise of this type. Using ITDM-1 or 2, though, the CW being used is not CW at the effective frequency, and the sample interleaving that occurs as a routine part of ITDM-1 or 2 reception would mean that the noise waveform was reordered in such a way that it would be unlikely to correlate with the transmitted waveform. Practically, ITDM-1 and 2 decorrelate noise, greatly reducing its effect on the data. This will also be the case for CHIRP pulses, which implies that a shorter CHIRP pulse (to reduce the chances of the medium affecting the pulse) could deliver acceptable low-noise performance if ITDM-1 or 2 is being used.

In ITDM, the sub-pulses may have a logical order (e.g. in the case of a CHIRP pulse); but there is no necessity that they are transmitted in that order. The job of the receiver is to digitise the incoming data, then to re-order it, so that if it contains a reflection, that reflection will correlate well with the transmitted pulse. This means that the sub-pulses can be transmitted in any order, and the receiver samples re-ordered so that the sub-pulses, if present in the received data, are in an order that will produce a received signal that correlates well with the transmitted pulse. Similarly, it is not necessary to transmit pulses separately—if several pulses are transmitted together, their sub-pulses can be interspersed, as the receiver will know how to re-order the sampled data to recreate the signals that constitute reflections of the transmitted pulses.

The discussion above mentions CHIRP as a conventional transmit/receive mechanism. The main attraction of CHIRP is the pulse compression (by correlation) process, that gives accurate target 5 sizes and reduces the impact of noise. All versions of ITDM can be performed using CHIRP transmission—treating the effective frequency as the maximum frequency of a standard transmission CHIRP, and the operating frequency as the maximum frequency of the ITDM CHIRP. Although ITDM performs well, generally, without CHIRP—reducing grating lobes, side lobes and noise—there's no reason not to use CHIRP, too—the overall ITDM-CHIRP process may retain the best properties of both methods.

The low-frequency sub-pulses used in ITDM must accurately represent the frequency information they are conveying. It is important that when a reflection arrives, so that the sample at the receiver is at a random time relative to the sub-pulse waveform, that sample is an accurate value. This means that the sub-pulse, although embodying a low frequency, must have enough information to be accurate.

For example, if the effective frequency is 500 kHz, and the operating frequency is 50 kHz, then a sample rate of 100 ksamples/s satisfies the Nyquist criterion in the creation by a D/A device of that sub-pulse; but if the reflected sub-pulse arrives so that the receiver samples it mid-way between two of those Nyquist-compliant samples, the value obtained might not be as close as would be desirable to the waveform being represented by that pulse. So, in transmitting the pulse, using the 100 ksamples/s sample set (in this example) would be the appropriate basis on which to define the frequency domain characteristics of the sub-pulse, but generating a 1 Msamples/s waveform with the same frequency domain properties may improve the method further; this would mean that the reflected signal when received would be more accurate and give a correct value whenever the samples are taken relative to the sub-pulse start. That is, it might be useful to use a Nyquist frequency relative to the effective frequency as the sample rate to be used when constructing sub-pulses.

Repeating the reference above, "When sampling at a rate of fs samples/second, if k is any positive or negative integer, we cannot distinguish between the sampled values of a sinewave of fo Hz and a sinewave of (fo+kfs) Hz." [Lyons p38].

Some embodiments of the present invention applies this principle to applications of sound waves, and in particular in sonar systems and ultrasound medical uses.

All forms of ITDM rely on the basic principle that a sine wave sampled at a given frequency is indistinguishable from a sine wave at a higher, known-offset, frequency. This fact has been used in undersampling (also known as bandpass sampling) of received signals in existing systems, but ITDM applies that property of signals in both transmission and reception. This allows frequency-dependent properties to be obtained without actually transmitting higher frequencies.

Overall, ITDM offers cost and performance improvements. The range and angular resolution of the desired effective frequency can be obtained, while working with array spacing and costs that result from the (lower) operating frequency.

ITDM may be used (as described above) to determine the relative distances traversed by two (or more) sub-pulses—as a multiple of sine cycles. This, in turn, may indicate the distance to a target (i.e. which caused the sub-pulses to be reflected) in multiples of sine cycles. This information may be used in beam forming, in sonar applications. For example, this information may indicate that the cycle count—i.e. the distance to target in multiples of sine cycles—differs across an array of receive elements.

In sonar systems, there is another advantage from ITDM—the loss of range (due to water absorbing the waveform's energy) that occurs at high frequencies means that in conventional systems the resolution obtained is always a trade-off between desired range and desired resolution. This trade-off is not present in ITDM—the effective frequency will give the desired resolution, and the operating frequency will give the desired range.

Other acoustic and electromagnetic systems 1—ultrasounds and radars, for example—will have different performance trade-offs to satisfy, but ITDM is expected to be useful.

It should also be emphasised that the advantages of ITDM are not restricted to sonars, ultrasounds and radars. Any system that performs a precision ranging function (underwater acoustic positioning systems like LBL, USBL, or radio frequency systems like GPS) may benefit from ITDM.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A method for use in imaging comprising:
    transmitting, from a transmitter, a first wave pulse;
    transmitting, from the transmitter, a second wave pulse, the second wave pulse being different to the first wave pulse, wherein the second wave pulse is transmitted after the first wave pulse, and a start time of the second wave pulse transmission is offset by a fraction of a sample interval from an end time of the first wave pulse transmission;
    receiving and sampling, at a receiver, respective reflections of the first and second wave pulses; and
    interleaving, using a processor, the samples of the received first and second wave pulses to generate a received waveform sample set, wherein the first and second wave pulses are created by:
        predicting the samples that would be obtained by sampling a waveform, having a first waveform bandwidth, at or above a Nyquist sampling frequency for the first waveform bandwidth if the waveform were received at a receiver;
        defining, from the predicted samples, at least a first group of predicted samples and a second group of predicted samples by assigning every nth predicted sample to the first group and every nth+1 predicted sample to the second group, where n is an integer; and
        generating the first and second wave pulses based on the first and second groups of predicted samples, respectively, such that the first and second wave pulses each have a bandwidth less than the first waveform bandwidth.

2. A method according to claim 1, wherein the method is a method of performing demodulation of a wave, and wherein a first reflection provides an in-phase (I) sample and wherein a second reflection provides a quadrature or near-quadrature (Q) sample, wherein the second wave pulse is transmitted at a known phase angle from the first wave pulse.

3. The method of claim 2, wherein the known phase angle is a phase angle of $\pi/2$ radians, with respect to a system operating frequency.

4. The method of claim 1, wherein the method is a method of performing demodulation of a wave, and wherein a first and a second wave pulse is transmitted, and wherein each respective reflection provides one of in-phase (I) data and quadrature or near-quadrature (Q) data, wherein the phase angle between the first and the second wave pulses is $2\pi/3$ radians, with respect to a system operating frequency.

5. The method claim 1, wherein the method is a method of performing demodulation of a wave, and wherein a first, a second and a third wave pulse is transmitted, and wherein each respective reflection provides one of in-phase (I) data and quadrature or near-quadrature (Q) data, wherein the phase angle between the first and the second wave pulses is $2\pi/3$ radians, with respect to a system operating frequency, and wherein the phase angle between the second and the third wave pulses is $2\pi/3$ radians, with respect to the system operating frequency.

6. The method of claim 1, wherein at least one wave pulse is a multiplexed signal.

7. The method of claim 1, further comprising:
obtaining phase information and magnitude information from at least one reflected wave pulse;
using the sample interval, the phase information and the magnitude information to derive a frequency of the reflected wave pulse, and to derive a Doppler shift of the associated sample; and
using the Doppler shift to derive the velocity of a target from which reflection occurred, relative to at least one of the transmitter and the receiver.

8. The method of claim 1, further including transmitting a duplicate of one of the first wave pulse or at least one second wave pulse.

9. The method of claim 1, wherein the method is a method of acoustic imaging, transmitting a first and second wave pulses comprises transmitting first and second acoustic wave pulses.

10. The method of claim 1, further including generating an image using the received waveform sample set.

11. The method of claim 1, wherein a plurality of substantially identical instances of the first wave pulse are transmitted and a plurality of substantially identical instances of the second wave pulse are transmitted.

12. A system for use in imaging, comprising:
a transmitter configured to transmit a first wave pulse and a second wave pulse, the second wave pulse being different to the first wave pulse, wherein the second wave pulse is transmitted after the first wave pulse, and a start time of the second wave pulse transmission is offset by a fraction of a sample interval from an end time of the first wave pulse transmission;
a receiver configured to receive and sample respective reflections of the first and second wave pulses; and
a processor configured to interleave the samples of the received first and second wave pulses to generate a received waveform sample set, wherein the first and second wave pulses are created by:
predicting the samples that would be obtained by sampling a waveform, having a first waveform bandwidth, at or above a Nyquist sampling frequency for the first waveform bandwidth if the waveform were received at a receiver;
defining, from the predicted samples, at least a first group of predicted samples and a second group of predicted samples by assigning every nth predicted sample to the first group and every nth+1 predicted sample to the second group, where n is an integer; and
generating the first and second wave pulses based on the first and second groups of predicted samples, respectively, such that the first and second wave pulses each have a bandwidth less than the first waveform bandwidth.

13. The system of claim 12, wherein the transmitter and receiver are arranged in an array, having an array spacing less than or equal to half the wavelength at the operating frequency.

14. The system according to claim 12, wherein the processor is operable to expand the set of receiver samples including ordering the receiver samples to correlate with the transmitted wave pulses.

15. The system according to claim 12, wherein the system is for acoustic imaging and the transmitter is configured to transmit acoustic wave pulses.

16. The system according to claim 12, wherein the processor is further configured to generate an image from the received waveform sample set.

17. The system of claim 12, wherein the transmitter is configured to transmit a plurality of substantially identical instances of the first wave pulse and a plurality of substantially identical instances of the second wave pulse.

* * * * *